(12) United States Patent
Kakutani

(10) Patent No.: US 7,375,855 B2
(45) Date of Patent: May 20, 2008

(54) IMAGE PROCESSING APPARATUS FOR CONVERTING IMAGE DATA BY UNIT OF MULTIPLE PIXELS

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1333 days.

(21) Appl. No.: 10/390,090

(22) Filed: Mar. 14, 2003

(65) Prior Publication Data

US 2004/0001549 A1    Jan. 1, 2004

(30) Foreign Application Priority Data

Mar. 20, 2002  (JP)  ............................. 2002-079592

(51) Int. Cl.
*H04N 1/405* (2006.01)
(52) U.S. Cl. ............... 358/3.03; 358/3.06; 358/3.23
(58) Field of Classification Search ............... 358/1.9, 358/3.06, 3.21, 3.23, 534, 3.03–3.05; 382/252
See application file for complete search history.

(56) References Cited

U.S. PATENT DOCUMENTS

| | | | | |
|---|---|---|---|---|
| 6,870,641 | B2 * | 3/2005 | Kakutani | 358/3.03 |
| 7,164,503 | B2 * | 1/2007 | Kakutani | 358/3.03 |
| 7,268,919 | B2 * | 9/2007 | Katsuyama | 358/3.03 |
| 2002/0089685 | A1 | 7/2002 | Kakutani | |
| 2006/0181737 | A1 * | 8/2006 | Kakutani | 358/3.03 |
| 2007/0171439 | A1 * | 7/2007 | Kakutani | 358/1.9 |

FOREIGN PATENT DOCUMENTS

JP       2002-185789       6/2002

OTHER PUBLICATIONS

Abstract of Japanese Patent Publication No. 2002-185789, Pub. Date: Jun. 28, 2002, Patent Abstracts of Japan.

* cited by examiner

*Primary Examiner*—Scott A. Rogers
(74) *Attorney, Agent, or Firm*—Martine Penilla & Gencarella, LLP

(57) ABSTRACT

The technique of the invention joins a preset number of adjacent pixels into a unit and collectively converts input image data of each unit into dot data. Here the image data is expressed by tone values of respective pixels constituting an image, and the dot data represents dot on-off state. The technique stores dot on-off state determined with regard to at least part of pixels included in a processed unit, which has been subjected to the data conversion, in such a manner that a pixel position in the processed unit is identifiable. The procedure of the data conversion by units specifies a target pixel, in which a dot on-off state is to be determined, in a unit, detects a dot creation status with regard to an object pixel that is located at a specific position relative to the target pixel, and determines the dot on-off state in the target pixel based on the detection result. This arrangement effectively prevents the picture quality of a resulting image from being worsened by conversion of the image data into the dot data by units.

18 Claims, 21 Drawing Sheets

Fig.19(a)
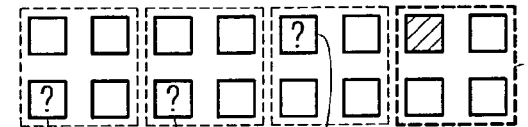
Fig.19(b)
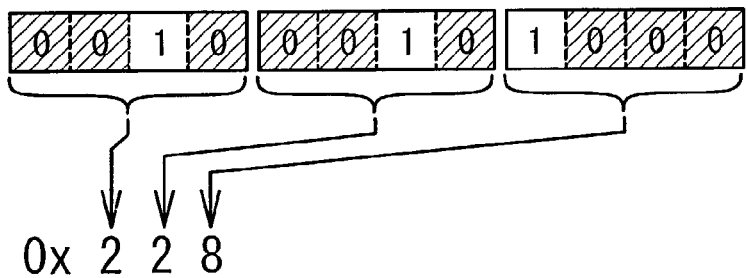
Fig.19(c) 0x 2 2 8
Fig.20(a)
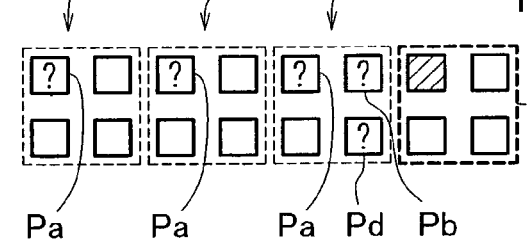
Fig.20(b)
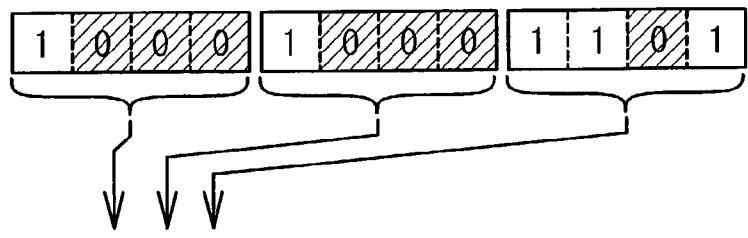
Fig.20(c) 0x 8 8 D Fig.23(b) RECORD DETECTION BUFFER A

IMAGE PROCESSING APPARATUS FOR CONVERTING IMAGE DATA BY UNIT OF MULTIPLE PIXELS

BACKGROUND OF THE INVENTION

1. Field of the Invention

The present invention relates to a technique of converting tone image data into dot data expressed by the dot on-off state. More specifically the invention pertains to a technique of collectively processing a preset number of adjacent pixels as a unit so as to allow for quick conversion of image data, while keeping the picture quality of a resulting image at a sufficiently high level.

2. Description of the Related Art

Image display apparatuses that create dots to express an image on a display medium, such as a printing medium or a liquid crystal screen, are widely used as the output device of diverse imaging equipment. The image display apparatus is capable of locally expressing only two states, the dot on state and the dot off state. An image of continuously varying tones is expressible by adequately regulating the dot creation density according to the varying tone of the image.

In order to create dots at adequate densities according to the tone values of an image, the error diffusion technique is generally applied for determination of the dot on-off state in each pixel in the image display apparatus. The error diffusion method diffuses an error of tone expression arising due to creation of a dot or no creation of any dot in a target pixel to peripheral unprocessed pixels in the vicinity of the target pixel, and determines the dot on-off state in each of the unprocessed pixels such as to cancel the tone errors diffused from peripheral processed pixels. Application of the error diffusion method enables the dot on-off state to be determined in each target pixel such as to cancel the error of tone expression arising in peripheral processed pixels, thus attaining creation of dots at adequate densities corresponding to the tone values of the image.

The error diffusion method advantageously allows for dot creation at adequate densities according to the tone values of the image, thus ensuring a high-quality resulting image. This method, however, requires diffusion of the tone error to peripheral unprocessed pixels every time the dot on-off state in each target pixel is determined. In the case of an image consisting of a large number of pixels, such diffusion undesirably extends the total image processing time. In order to solve such drawbacks, the inventors of the present invention have developed and filed a technique of joining a preset number of adjacent pixels into a unit and determining the dot on-off state with diffusion of the tone error by units (JAPANESE PATENT APPLICATION No. 2001-238117).

In the method of determining the dot on-off state by units, an identical series of processing is repeated for the respective units. This may result in creation of a dot at identical pixel positions in multiple units. These dots may be visually recognized as a periodical pattern and worsen the picture quality of the resulting image. The potential appearance of a periodical pattern in the process of determining the dot on-off state by units is not restrictive to the error diffusion method but may be found in other known methods.

SUMMARY OF THE INVENTION

The object of the present invention is thus to provide a technique that determines the dot on-off state of target pixels collectively in each unit so as to allow for quick data conversion, while effectively preventing the occurrence of a periodical pattern in order to display a high-quality resulting image.

In order to attain at least part of the above and the other related objects, the present invention is directed to an image processing apparatus that converts image data expressed by tone values of respective pixels constituting an image into dot data representing dot on-off state. The image processing apparatus includes: a dot data conversion module that joins a preset number of adjacent pixels into a unit and collectively converts the image data of each unit into the dot data; and a dot on-off state storage module that stores dot on-off state determined with regard to at least part of pixels included in a processed unit, which has been subjected to the data conversion, in such a manner that a pixel position in the processed unit is identifiable. The dot data conversion module has: a target pixel specification sub-module that successively specifies a target pixel, in which a dot on-off state is to be determined, in each unit; a dot creation status detection sub-module that detects a dot creation status with regard to an object pixel that is located at a specific position relative to the target pixel, among the at least part of the pixels included in the processed unit, for which the dot on-off state is stored; and a dot on-off state determination sub-module that determines the dot on-off state in the target pixel, based on a tone value of the image data at the target pixel and the dot creation status detected with regard to the object pixel at the specific position.

There is an image processing method corresponding to the above image processing apparatus. The present invention is accordingly directed to an image processing method of converting image data expressed by tone values of respective pixels constituting an image into dot data representing dot on-off state. The image processing method includes the steps of: joining a preset number of adjacent pixels into a unit and collectively converting the image data of each unit into the dot data; and storing dot on-off state determined with regard to at least part of pixels included in a processed unit, which has been subjected to the data conversion, in such a manner that a pixel position in the processed unit is identifiable. The converting step has the sub-steps of: successively specifying a target pixel, in which a dot on-off state is to be determined, in each unit; detecting a dot creation status with regard to an object pixel that is located at a specific position relative to the target pixel, among the at least part of the pixels included in the processed unit, for which the dot on-off state is stored; and determining the dot on-off state in the target pixel, based on a tone value of the image data at the target pixel and the dot creation status detected with regard to the object pixel at the specific position.

In the image processing apparatus and the corresponding image processing method of the present invention, the technique joins a preset number of adjacent pixels into a unit and collectively converts image data of each unit into dot data. The data conversion by units detects a dot creation status in a processed unit according to the following procedure and determines the dot on-off state in a target pixel based on the detection result. The dot on-off state determined with regard to at least part of pixels included in a processed unit has been stored in advance in such a manner that a pixel position in the processed unit is identifiable. The procedure specifies a target pixel, in which a dot on-off state is to be determined, in each unit, and detects a dot creation status with regard to an object pixel that is located at a specific position relative to the target pixel, among the at least part of the pixels included in the processed unit, for which the dot on-off state is stored. The object pixel for detection of the dot creation status may be a single pixel or multiple pixels located at a specific position relative to the target pixel. The position of the object pixel may be varied according to the position of the target pixel.

The technique of the invention detects the dot creation status of the object pixel in the processed unit and determines the dot on-off state in the target pixel based on the detection result. In the process of converting image data into dot data by units, this arrangement effectively prevents creation of dots in a periodical pattern at a cycle of multiple units. The periodical pattern is often visually recognizable and worsens the picture quality of the resulting image. The arrangement thus keeps the resulting image at a sufficiently high picture quality.

In one preferable application of the image processing apparatus or the corresponding image processing method of the invention, the procedure prohibits formation of a dot in the target pixel, when the detected dot creation status shows presence of a dot in the object pixel at the specific position relative to the target pixel.

In the process of converting image data into dot data by units, this arrangement effectively prevents creation of dots in a periodical pattern at a cycle of multiple units, which is often visually recognizable and worsens the picture quality of the resulting image, thus keeping the resulting image at a sufficiently high picture quality.

In one preferable embodiment of the image processing apparatus or the corresponding image processing method, the procedure detects dot creation status with regard to multiple object pixels that are located at the specific position relative to the target pixel, and prohibits formation of a dot in the target pixel, when the detected dot creation status shows presence of a dot in any of the multiple object pixels at the specific position.

The arrangement of prohibiting formation of a dot in the target pixel in the presence of a dot in any of the multiple object pixels desirably prevents creation of dots in a periodical pattern. Especially in an image area of sparse dots, it is rare that a dot has been created in all of the multiple object pixels. The prohibition of dot formation in the target pixel in the case of detection of the presence of a dot in any of the multiple object pixels at the specific position thus effectively prevents the occurrence of a periodical pattern.

In another preferable embodiment of the image processing apparatus or the corresponding image processing method, the procedure detects dot creation status with regard to multiple object pixels that are located at the specific position relative to the target pixel, and prohibits formation of a dot in the target pixel, when the detected dot creation status shows presence of a dot in all of the multiple object pixels at the specific position.

The arrangement of prohibiting formation of a dot in the target pixel in the presence of a dot in all of the multiple object pixels desirably prevents creation of dots in a periodical pattern. Especially in an image area having dots at a high density, it is highly possible that a dot has been created in at least one of the multiple object pixels. The prohibition of dot formation in the target pixel in the case of detection of the presence of a dot in all of the multiple object pixels at the specific position thus effectively prevents the occurrence of a periodical pattern.

In the image processing apparatus and the corresponding image processing method, the dot creation status detected in the processed unit may be reflected on the determination of the dot on-off state in the target pixel in a different manner. The procedure recommends formation of a dot in the target pixel, when the detected dot creation status shows presence of a dot in the object pixel at the specific position in the processed unit.

Unlike natural images, when the image data represents a flat image, such as a graph or a table, creation of dots in a periodical pattern may give the favorable picture quality to the resulting image. The presence of an irregular area in a periodical dot creation pattern may be visually recognizable and worsen the picture quality of the resulting image. The promoted dot formation in the target pixel in the case of detection of the presence of a dot in the object pixel at the specific position in the processed unit effectively prevents the occurrence of any irregular patterned area, thus keeping the picture quality of the resulting image at a sufficiently high level.

In another preferable application of the image processing apparatus or the corresponding image processing method of the invention, the procedure calculates a summation of tone values of the respective pixels included in each unit, and determines the dot on-off state in the target pixel, based on the calculated summation as well as the tone value of the image data at the target pixel and the dot creation status detected with regard to the object pixel at the specific position.

The dot creation status is varied according to the tone values of the pixels. The pattern appearing in the process of determining the dot on-off state by units may also be varied according to the tone values of the pixels. Reflection of the calculated summation of the tone values of the respective pixels included in each unit on determination of the dot on-off state in the target pixel thus more effectively prevents creation of dots in a fixed pattern. The calculated summation used for determination of the dot on-off state may be any value equivalent to the substantial summation of the respective pixels in each unit. For example, the mean of the tone values of the respective pixels in each unit may accordingly replace the summation.

In the image processing apparatus or the corresponding image processing method of the above application, the procedure may suppress formation of a dot in the target pixel, when the calculated summation is not greater than a predetermined value.

The smaller tone values of the image data, which are converted into the dot data, cause sparse formation of dots. In the case of converting the image data of small tone values into dot data by units, sparse creation of dots may form a periodical pattern and worsen the picture quality of the resulting image. The preferable procedure suppresses formation of a dot in the target pixel, when the calculated summation of the tone values of the respective pixels included in each unit is not greater than a predetermined value and the presence of a dot is detected in the object pixel at the specific position relative to the target pixel. This arrangement effectively prevents creation of sparse dots in a periodical pattern, thus keeping the picture quality of the resulting image at a sufficiently high level.

In the image processing apparatus or the corresponding image processing method of the above application, the procedure may promote formation of a dot in the target pixel, when the calculated summation is not less than a preset value.

The greater tone values of the image data, which are converted into the dot data, cause pixels without dots to appear sparsely among the densely formed dots. In the case of converting the image data of large tone values into dot data by units, the sparse appearance of pixels without dots may form a periodical pattern and worsen the picture quality of the resulting image. The preferable procedure promotes formation of a dot in the target pixel, when the calculated summation of the tone values of the respective pixels in each unit is not less than a preset value and the presence of a dot is detected in the object pixel at the specific position relative to the target pixel. This arrangement effectively prevents the sparse appearance of pixels without dots in a periodical pattern, thus keeping the picture quality of the resulting image at a sufficiently high level.

In the image processing apparatus or the corresponding image processing method of the above application, the object pixel position for detection of the dot creation status may be changed by the following method. The procedure stores a mapping of an object pixel position for detection of the dot creation status to a tone value, calculates the summation of the tone values of the respective pixels included in each unit, and detects the dot creation status with regard to an object pixel position mapped to the calculated summation of the tone values.

This arrangement enables the dot creation status to be detected at an adequate pixel position according to the tone value, and thus effectively prevents creation of dots in a fixed pattern in the process of converting the image data into the dot data by units.

In the image processing apparatus or the corresponding image processing method of the above preferable arrangement, the procedure may store a mapping, such that a pixel position mapped to a first tone value that is smaller than a predetermined value is farther from the target pixel than a pixel position mapped to a second tone value that is greater than the predetermined value.

The smaller tone values of the image data, which are converted into the dot data, cause sparse formation of dots. In such areas, the interval between adjoining dots is relatively wide even in the case of dot creation in a periodical pattern. Storage of the mapping such that a pixel position mapped to a first tone value that is smaller than a predetermined value is farther from the target pixel than a pixel position mapped to a second tone value that is greater than the predetermined value thus effectively prevents dot creation in a periodical pattern in an image area of small tone values.

In the image processing apparatus or the corresponding image processing method of the invention, the object pixel position for detection of the dot creation status may be changed in the following manner. The procedure stores a mapping of an object pixel position for detection of the dot creation status to a tone value, detects the dot creation status with regard to an object pixel position mapped to the tone value of the target pixel, and determines the dot on-off state in the target pixel based on the detection result in addition to the tone value of the target pixel.

This arrangement sets the object pixel position for detection of the dot creation status at an adequate place according to the tone value of the pixel, and thus effectively prevents creation of dots in a periodical pattern.

In the image processing apparatus or the corresponding image processing method of the invention, an error diffusion method may be applied to determine the dot on-off state in the target pixel in each unit. A threshold value, which is referred to in the error diffusion method for the determination, may be varied according to the dot creation status in the processed unit.

The variation in threshold value of the error diffusion method enables the detection result of the dot creation status in the object pixel at the specific position in the processed unit to be readily reflected on the determination of the dot on-off state in the target pixel. The error diffusion method diffuses a tone error arising in the target pixel to peripheral unprocessed pixels and makes the diffused errors reflected on determination of the dot on-off state in these peripheral pixels, thus desirably canceling the tone error. A significantly large tone error may arise in the target pixel by reflection of the detection result of the dot creation status in the processed unit on the determination of the dot on-off state in the target pixel. Application of the error diffusion method for determination of the dot on-off state in the target pixel effectively cancels the large tone error and ensures a high-quality resulting image.

In the image processing apparatus or the corresponding image processing method that applies the error diffusion method for determination of the dot on-off state in the target pixel, the preferable procedure decides that no dot is to be created in the target pixel when the detected dot creation status shows the presence of a dot in the object pixel at the specific position relative to the target pixel.

In this application, in the case of detection of the presence of a dot in the object pixel at the specific position relative to the target pixel, it is determined that no dot is to be created in the target pixel. The arrangement readily prevents creation of dots in a fixed pattern in the process of converting the image data into the dot data by units. A significantly large tone error may arise in the target pixel by the determination that no dot is to be created in the target pixel. Application of the error diffusion method for determination of the dot on-off state in the target pixel effectively cancels the large tone error and prevents the picture quality of the resulting image from being worsened.

In the image processing apparatus or the corresponding image processing method of the invention, the dot on-off state of multiple pixels constituting the processed unit may be stored in the following manner. The procedure stores a data array of multiple consecutive data, which represent the dot on-off state of multiple pixels and are arranged in a specific order that allows for identification of the processed unit to which each pixel belongs and a position of the pixel in the processed unit.

In this application, the dot on-off state with regard to each of multiple pixels is stored in the form of a data array, in such a manner that the processed unit to which each pixel belongs and the position of the pixel in the processed unit are easily identifiable by the order of multiple data in the data array. The dot on-off states at the multiple pixel positions are stored as one data array. This advantageously facilitates handling of the data.

In the image processing apparatus or the corresponding image processing method of the invention, data representing the dot on-off state of each pixel may be stored corresponding to the pixel position in the unit. The procedure stores a data array of multiple consecutive data, which represent the dot on-off state of multiple pixels, are classified into each pixel position in the processed unit, and are arranged in a specific order that allows for identification of the processed unit to which each pixel belongs, corresponding to each pixel position in the processed unit.

In this application, the pixel position in the unit is identifiable by the difference in data array, while the processed unit to which each pixel belongs is identifiable by the order of multiple data in the data array. The arrangement enables data representing the dot on-off state of each pixel to be readily stored in such a manner that the pixel position in the unit is identifiable. This arrangement also shortens the bit length of the data array corresponding to each pixel position and advantageously facilitates handling of the data array.

The principles of the image processing apparatus are favorably applicable to a printing apparatus that creates dots on a printing medium to print an image. The image processing apparatus of the invention converts the image data into the dot data by units, so as to attain high-speed data conversion, while detecting the dot creation status in the object pixel at the specific position in the processed unit, in order to prevent creation of dots in a fixed pattern. Application of the image processing apparatus, which quickly converts the image data into the dot data, to the printing apparatus advantageously shortens the total time required for printing while keeping the picture quality of the resulting image at a sufficiently high level.

The image processing method discussed above may be actualized by the functions of a computer that reads a computer program corresponding to the image processing method. Another application of the present invention is accordingly a computer program product corresponding to the image processing method discussed above.

The present invention is thus directed to a computer program product that attains a method of converting image data expressed by tone values of respective pixels constituting an image into dot data representing dot on-off state. The computer program product has: a computer readable recording medium; and a computer program that is stored in the recording medium. The computer program causes a computer to attain the functions of: joining a preset number of adjacent pixels into a unit and collectively converting the image data of each unit into the dot data; and storing dot on-off state determined with regard to at least part of pixels included in a processed unit, which has been subjected to the data conversion, in such a manner that a pixel position in the processed unit is identifiable. The converting function includes the sub-functions of: successively specifying a target pixel, in which a dot on-off state is to be determined, in each unit; detecting a dot creation status with regard to an object pixel that is located at a specific position relative to the target pixel, among the at least part of the pixels included in the processed unit, for which the dot on-off state is stored; and determining the dot on-off state in the target pixel, based on a tone value of the image data at the target pixel and the dot creation status detected with regard to the object pixel at the specific position.

The computer reads the computer program stored in the recording medium and executes the respective functions discussed above to convert image data into dot data by units so as to attain the high-speed processing, while detecting the status of dot creation in processed units in order to prevent creation of dots in a periodical pattern and thereby keep the picture quality of a resulting image at a sufficiently high level.

The above and other objects, features, aspects, and advantages of the present invention will become more apparent from the following detailed description of the preferred embodiments with the accompanying drawings.

BRIEF DESCRIPTION OF THE DRAWINGS

FIG. 19 conceptually shows setting of the record detection data in a second modified example of the first embodiment;

FIG. 20 conceptually shows different setting of the record detection data in the second modified example of the first embodiment;

DESCRIPTION OF THE PREFERRED EMBODIMENTS

Some modes of carrying out the invention are discussed below as preferred embodiments in the following sequence:
A. Outline of a Common Behavior of Embodiments
B. Construction of Apparatus
C. Outline of Image Data Conversion Process
D. First Embodiment
  D-1. Tone Number Conversion Process by Units
  D-2. Intra-Unit Multi-Valuing Process
  D-3. Intra-Unit Multi-Valuing Process of First Embodiment
  D-4. Modifications
E. Second Embodiment
  E-1. Intra-Unit Multi-Valuing Process of Second Embodiment
  E-2. Modifications

A. Outline of Invention

Figure 1:
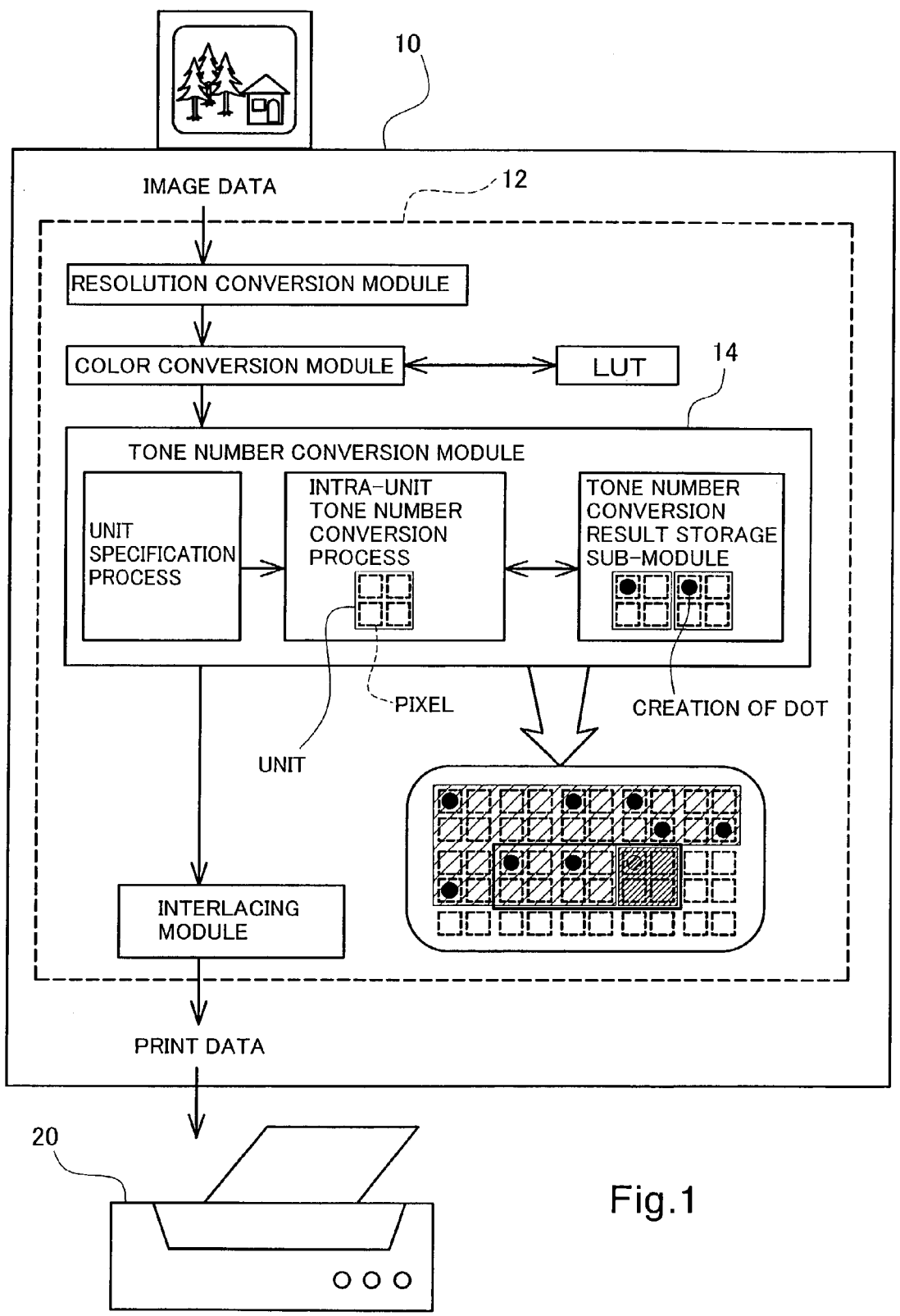
FIG. 1 shows a printing system for conceptually explaining a common behavior of embodiments of the present invention.

For better understanding, a common behavior of embodiments is roughly described, prior to discussion of preferred embodiments in detail. FIG. 1 illustratively shows a printing system for conceptually explaining the outline of the common behavior of embodiments. The printing system shown in FIG. 1 has a computer 10 as an image processing apparatus and a color printer 20. The computer 10 receives color image data expressed by RGB color tone values from an imaging device, such as a digital camera or a color scanner, and converts the input color image data into print data expressed by the presence or absence of respective color dots printable by the color printer 20. Such conversion of the color image data is carried out by a special program called a printer driver 12. The computer 10 may create the color image data expressed by the RGB color tone values according to a diversity of application programs.

The printer driver 12 has multiple modules including a resolution conversion module, a color conversion module, a tone number conversion module 14, and an interlacing module. The series of processing executed by the respective modules will be discussed later. The tone number conversion module 14 converts the image data into data expressed by the dot on-off state. The tone number conversion module 14 of the embodiment carries out the processing by units for speeding up. More specifically the tone number conversion module 14 joins a plurality of adjacent pixels into a unit and carries out determination of the dot on-off state of the respective pixels collectively in each unit. The method of determining the dot on-off state of the respective pixels collectively in each unit will be discussed later.

A conceptive view indicated by the arrow below the frame of the tone number conversion module 14 in FIG. 1 shows conversion of image data into dot data by the functions of the tone number conversion module 14. The small squares of broken line represent pixels. Four pixels constitute one unit. A hatched unit with dense slant lines represents a currently processed unit or a target unit in which image data are being converted into dot data. A hatched area with sparse slant lines represents a processed area, in which image data have already been subjected to determination of the dot on-off state and converted into dot data. The method of determining the dot on-off state by units executes the identical series of processing for the respective units. Especially in an area of image data having little variation in tone value, dots may be created in a periodical pattern at a cycle of multiple units. The presence of such an area having dots created in a periodical pattern is often visually recognizable and may thereby worsen the picture quality of the resulting image.

The conceptive view of FIG. 1 shows an example of dot creation in a fixed pattern, where dots are created at identical pixel positions in a plurality of consecutive units. In the illustrated example, a dot is created in an upper left pixel in two consecutive units on the left side of the currently processed unit or target unit (the hatched unit with dense slant lines). If a dot is created again in the upper left pixel in the target unit, three consecutive units have dots at identical pixel positions. This may be visually recognizable as a pattern and worsen the picture quality of the resulting image. Creation of dots at identical pixel positions in a plurality of consecutive units is just an example. Another example is creation of dots in a periodical manner at a cycle of multiple units.

In order to prevent the occurrence of such problems, the tone number conversion module 14 in the printing system shown in FIG. 1 stores the decision results of dot-on pixel positions in respective processed units into a tone number conversion result storage sub-module. The tone number conversion module 14 reads the stored decision results from the tone number conversion result storage sub-module and determines the dot on-off state in each unit based on the decision results in such a manner as to prevent creation of dots in a fixed pattern. In the illustrated example of FIG. 1, dots have been created at identical pixel positions in two consecutive units. The tone number conversion module 14 thus determines the dot on-off state in the target unit such as to prevent a dot from being created again at the identical pixel position. The technique of the invention carries out determination of the dot on-off state by units in such a manner as to prevent dots from being created in a visually recognizable pattern. This arrangement attains quick image data conversion by determining the dot on-off state by units and ensures the high picture quality of a resulting printed image. The details of such image processing are discussed below with reference to preferred embodiments.

B. Construction of Apparatus

Figure 2:
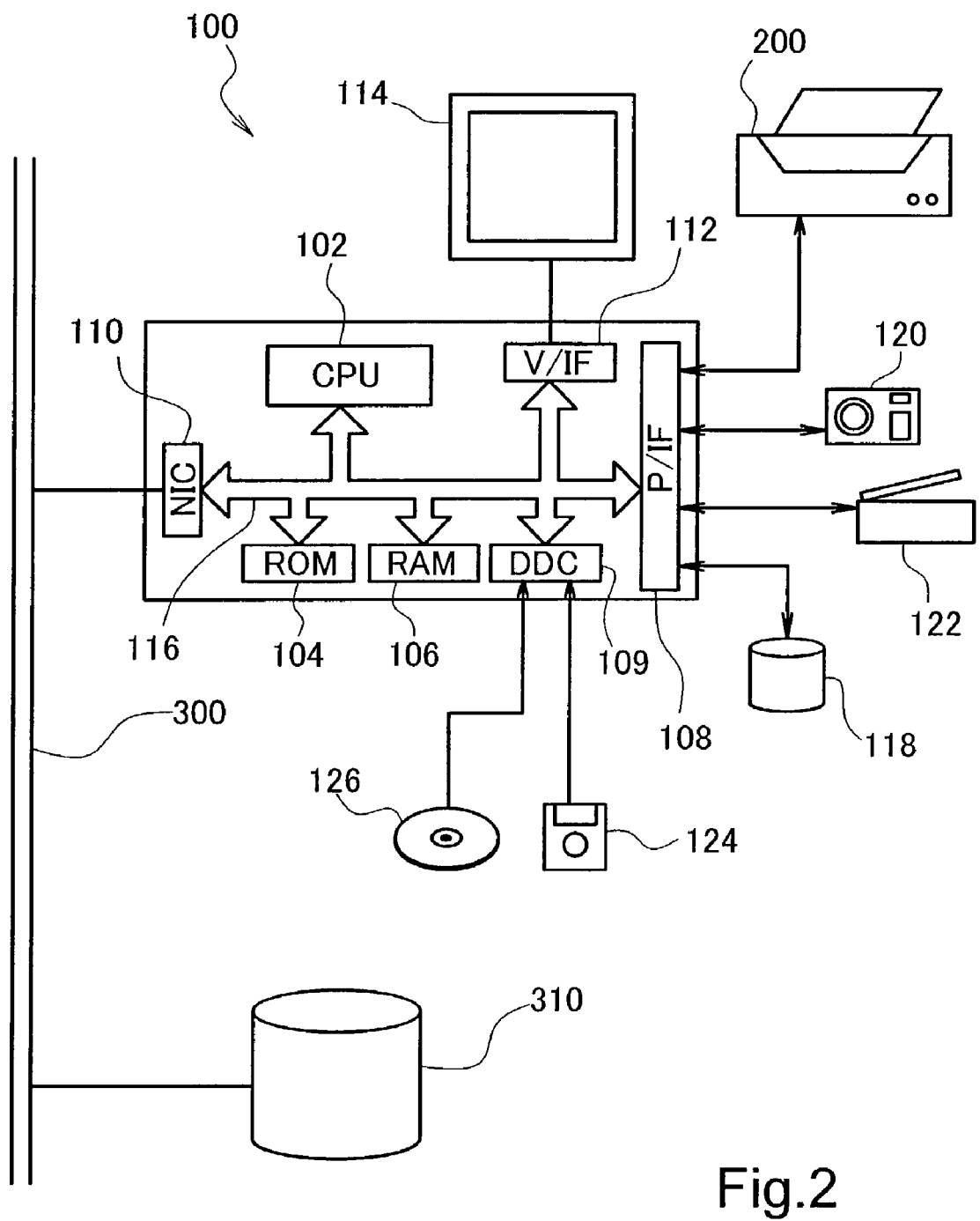
FIG. 2 schematically illustrates the construction of a computer as an image processing apparatus in an embodiment according to the present invention.

FIG. 2 schematically illustrates the construction of a computer 100 as an image processing apparatus in an embodiment according to the present invention. The computer 100 corresponds to the computer 10 shown in FIG. 1 and is constructed as a known computer including a CPU 102, a ROM 104, and a RAM 106, which are mutually connected via a bus 116.

The computer 100 also includes a disk controller DDC 109 for reading data from a flexible disk 124 or a compact disc 126, a peripheral equipment interface P/IF 112 for transmission of data to and from peripheral equipment, and a video interface V/IF 112 for actuating a CRT 114. A color printer 200 (discussed later), which corresponds to the color printer 20 shown in FIG. 1, and a hard disk 118 are linked with the P/IF 108. Connection of a digital camera 120 or a color scanner 122 to the P/IF 108 enables images transmitted from the digital camera 120 and those read by the color scanner 122 to be printed. Attachment of a network interface card NIC 110 connects the computer 100 with a communication line 300 to fetch data stored in a storage device 310 connected to the communication line 300.

Figure 3:
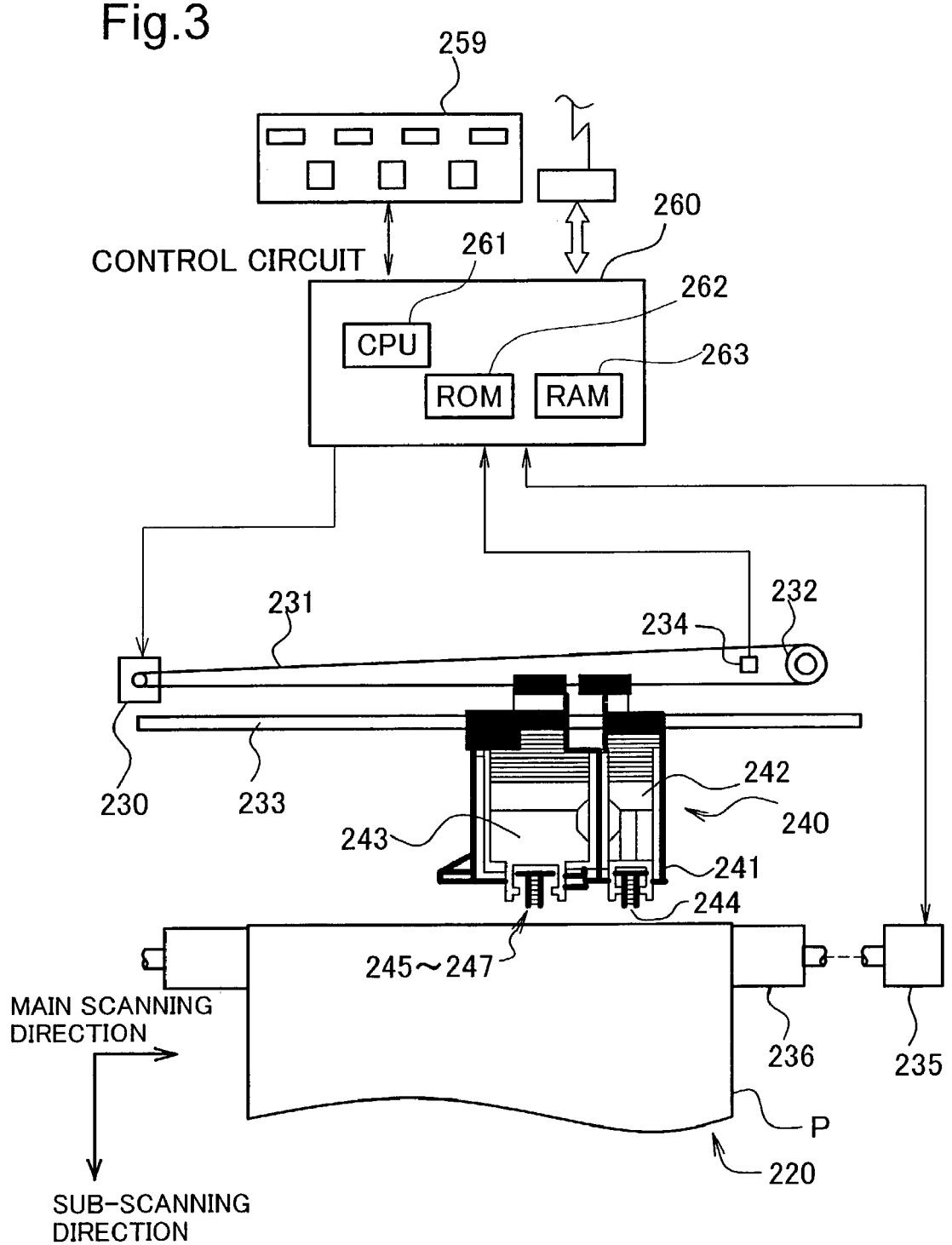
FIG. 3 schematically illustrates the structure of a color printer as an image display apparatus in the embodiment.

FIG. 3 schematically illustrates the structure of the color printer 200 as an image display apparatus in the embodiment. The color printer 200 is an ink jet printer that creates dots of four color inks, that is, cyan, magenta, yellow, and black. The ink jet printer may create ink dots of six color inks, that is, light cyan ink having the lower cyan dye density and light magenta ink having the lower magenta dye density in addition to the above four color inks. In the description below, the cyan ink, the magenta ink, the yellow ink, the black ink, the light cyan ink, and the light magenta ink may respectively be referred to as the C ink, the M ink, the Y ink, the K ink, the LC ink, and the LM ink.

The color printer 200 has a mechanism of actuating a print head 241 mounted on a carriage 240 to implement ink ejection and dot creation, a mechanism of driving a carriage motor 230 to move the carriage 240 back and forth along an axis of a platen 236, a mechanism of driving a sheet feed motor 235 to feed a sheet of printing paper P, and a control circuit 260 that controls the dot creation, the movement of the carriage 240, and the feed of the printing paper P.

An ink cartridge 242 where the K ink is kept and an ink cartridge 243 where the C ink, the M ink, and the Y ink are kept are attached to the carriage 240. Attachment of the ink cartridges 242 and 243 to the carriage 240 causes the respective color inks in the ink cartridges 242 and 243 to be led to ink ejection heads 244 through 247 of the respective colors disposed below the print head 241 via ink conduits (not shown). Each of the ink ejection heads 244 through 247 has a nozzle array including 48 nozzles arranged at a fixed nozzle pitch k.

The control circuit 260 includes a CPU 261, a ROM 262, and a RAM 263. The control circuit 260 controls the operations of the carriage motor 230 and the sheet feed motor 235 to regulate main scans and sub-scans of the carriage 240 and to make ink droplets ejected from the respective nozzles at adequate timings based on the print data supplied from the computer 100. Under the control of the control circuit 260, ink dots of the respective colors are created at adequate positions on the printing paper P. The color printer 200 prints color images based on this principle.

A diversity of methods are applicable for the ejection of ink droplets from the ink ejection heads of the respective colors. One applicable method uses piezoelectric elements for ink ejection. Another applicable method uses a heater located in each ink conduit to generate bubbles in the ink conduit for ejection of ink droplets. The color printer 200 is not restricted to the ink jet printer, but may be a printer that utilizes heat transfer to create ink dots on the printing paper or a printer that utilizes static electricity to make toner powder of each color adhere to a printing medium.

The color printer 200 may be a variable dot printer that regulates the size of the ejected ink droplets or regulates the number of ink droplets ejected at once, so as to adjust the size of ink dots created on the printing paper.

In the color printer 200 of the hardware construction discussed above, the carriage motor 230 is driven to move the ink ejection heads 244 through 247 of the respective color inks relative to the printing paper P in a main scanning direction, while the sheet feed motor 235 is driven to move the printing paper P in a sub-scanning direction. The control circuit 260 repeats the main scans and sub-scans of the carriage 240 according to the print data and actuates the nozzles at adequate timings for ejection of ink droplets. The color printer 200 accordingly prints a color image on the printing paper P.

C. Outline of Image Data Conversion Process

Figure 4:
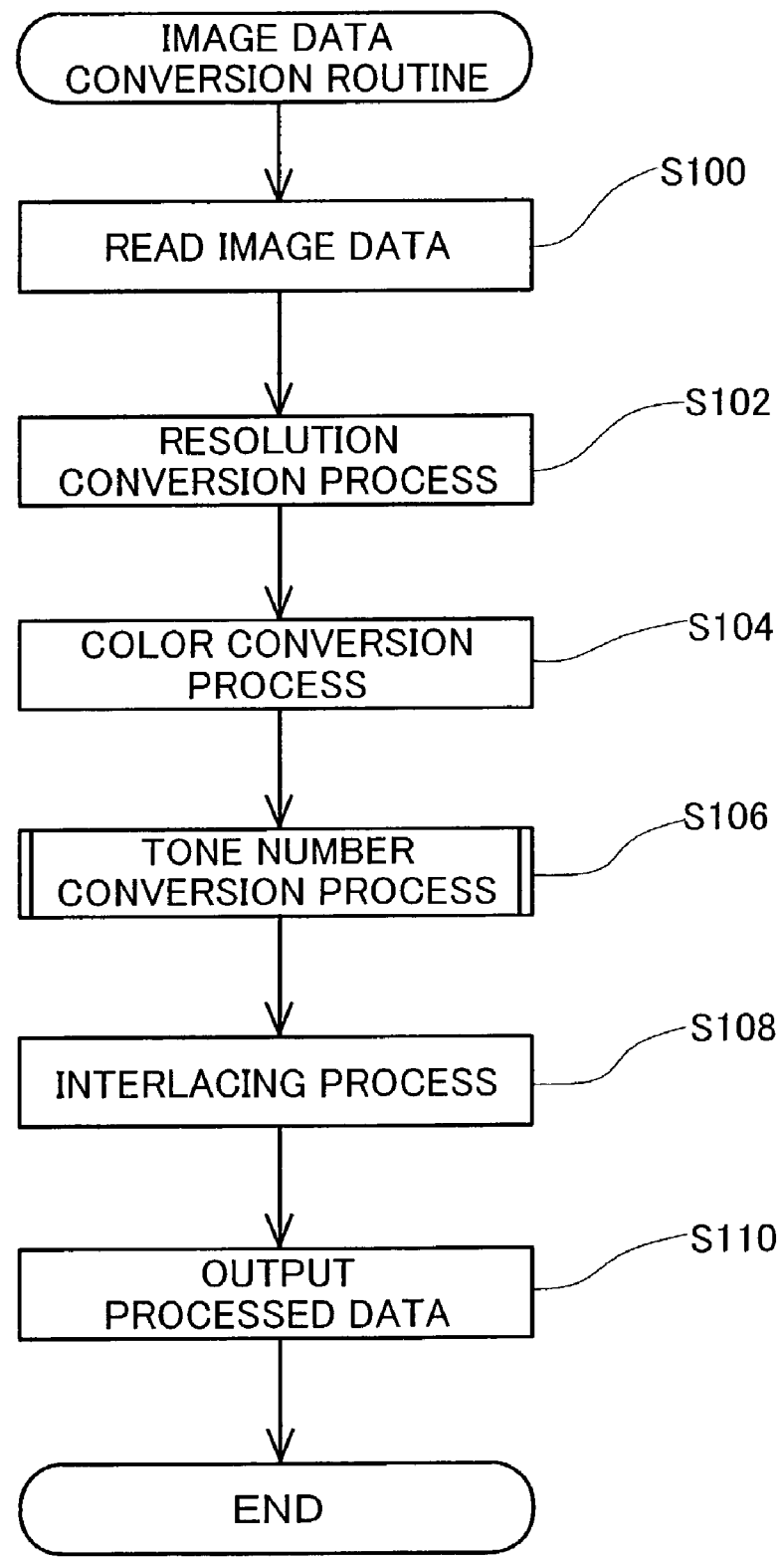
FIG. 4 is a flowchart showing a routine of image data conversion process executed by the image processing apparatus of the embodiment.

FIG. 4 is a flowchart showing a preset series of image processing to convert input image data into print data, which is executed in the computer 100 as the image processing apparatus of the embodiment. This processing routine starts when the operating system of the computer 100 activates the printer driver 12 (see FIG. 1). The image data conversion routine of the embodiment is briefly described with reference to the flowchart of FIG. 4.

When the program enters the image data conversion routine, the printer driver 12 first reads target RGB color image data, which is the object of data conversion (step S100), and converts the resolution of the input color image data into a printing resolution suitable for printing by the color printer 200 (step S102). When the resolution of the input color image data is lower than the printing resolution, linear interpolation is carried out to generate new data between the adjacent existing image data and thereby convert the resolution of the image data into the printing resolution. When the resolution of the input color image data is higher than the printing resolution, on the other hand, the existing data are skipped at a predetermined rate for conversion of the resolution of the image data into the printing resolution.

After conversion of the resolution, the printer driver 12 carries out color conversion of the color image data (step S104). The color conversion process converts the color image data expressed by a combination of the tone values of the colors R, G, and B into image data expressed by a combination of the tone values of the colors used in the color printer 200, for example, C, M, Y, and K. The high-speed color conversion is attained by referring to a three-dimensional numerical table called a color conversion table.

The printer driver 12 carries out a tone number conversion process subsequent to the color conversion process (step S106). The RGB image data have been converted to the tone data of the C, M, Y, and K colors by the color conversion process. The tone data of each color has a range of 256 tones, that is, from a tone value 0 to a tone value 255. The color printer 200 of the embodiment is, however, capable of taking only either one of the two states 'dot on state' and 'dot off state'. It is accordingly required to convert the tone data of each color having the range of 256 tones into image data of 2 tones expressible by the color printer 200. Such conversion of the tone number is called the tone number conversion process. As described later, the printer driver 12 of the embodiment joins a preset number of pixels into a unit and carries out the tone number conversion process collectively in each unit. This attains the high-speed processing. The printer driver 12 stores the decision results of dot-on pixel positions in processed units, and makes the stored decision results reflected on the determination of the dot on-off state in a target unit. This arrangement effectively prevents the occurrence of dot creation in a fixed pattern, which may arise in the tone number conversion process by units. The tone number conversion process will be discussed later in detail.

After the tone number conversion process, the printer driver 12 carries out an interlacing process (step S108). The interlacing process rearranges the image data (dot data) converted into the format representing the dot on-off state in a specific order to be transferred to the color printer 200 by taking into account the order of dot creation. The printer driver 12 outputs the resulting image data, which have undergone the interlacing process, as print data to the color printer 200 (step S110). The color printer 200 creates ink dots of the respective colors on a printing medium according to the print data, thus printing a color image corresponding to the image data on the printing medium.

D. First Embodiment

The following describes a tone number conversion process of a first embodiment, which is included in the image data conversion routine shown in the flowchart of FIG. 4. As mentioned previously, the procedure of the embodiment joins multiple pixels into a unit and carries out the tone number conversion process by units. As the basis of the tone number conversion process of the first embodiment, the description first regards a method of carrying out the tone number conversion process by units. A procedure of making the decision results with regard to processed units reflected on the determination of the dot on-off state in a target unit is then discussed as part of the tone number conversion process of the first embodiment.

D-1. Tone Number Conversion Process by Units

Figure 5:
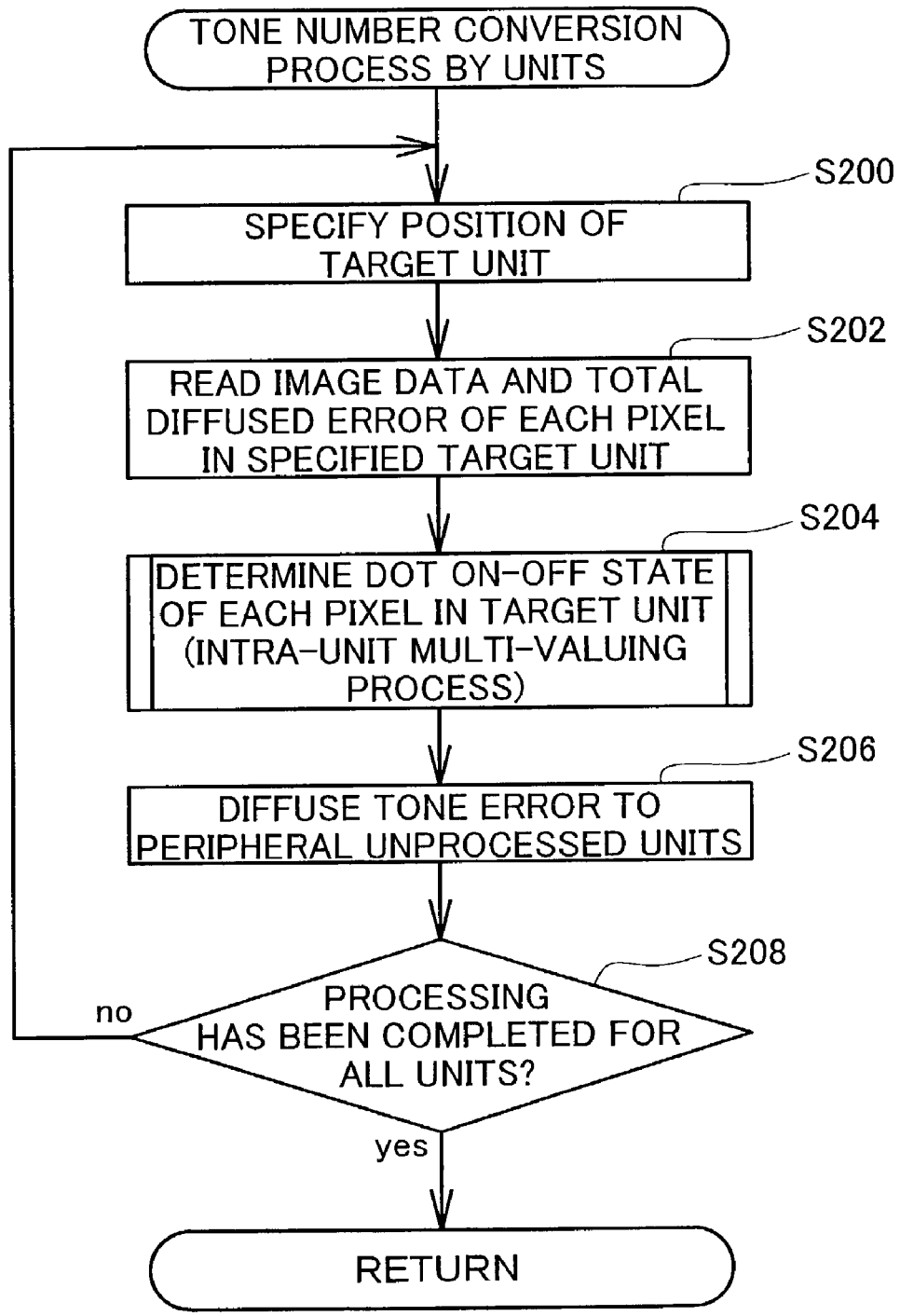
FIG. 5 is a flowchart showing a routine of tone number conversion process by units.
Figure 6A:
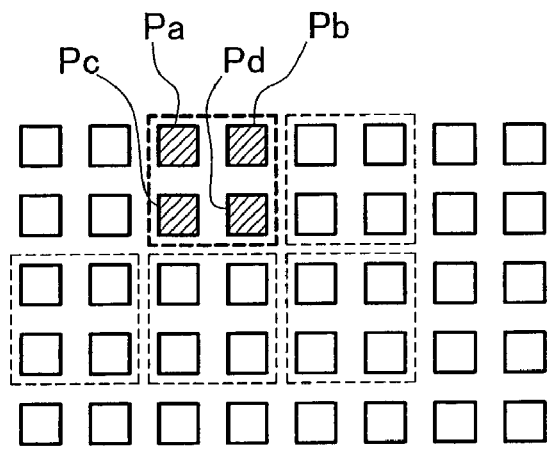
FIG. 6 conceptually shows some examples of setting a target unit, into which a preset number of adjacent pixels are joined.
Figure 6B:
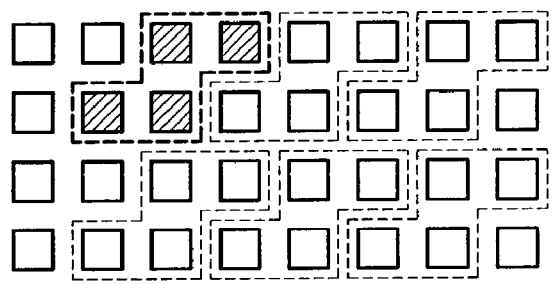
Figure 6C:
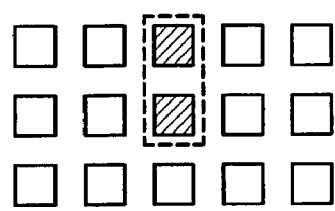
Figure 6D:
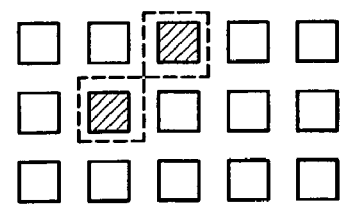

FIG. 5 is a flowchart showing a routine of the tone number conversion process by units. This routine is executed by the CPU 102 in the computer 100. The color printer 200 of the embodiment is capable of creating ink dots of four colors C, M, Y, and K as mentioned previously. The CPU 102 accordingly carries out the processing for each color ink. For the simplicity of explanation, the color is not specified in the following description. The description with the specified color is also applicable to the other non-specified colors, unless otherwise specified.

When the program enters the tone number conversion process by units, the CPU 102 first specifies the position of a target unit to be processed (step S200). The tone number conversion process by units joins a preset number of adjoining pixels into a unit and determines the dot on-off state of the respective pixels collectively in each unit. The procedure thus first specifies the position of a target unit in an image, which is the object of determination of the dot on-off state.

FIG. 6 conceptually shows some examples of setting a target unit, into which a preset number of adjacent pixels are joined. Each of the small squares shown in FIG. 6 represents a pixel. An image consists of multiple pixels arranged in lattice. In the example of FIG. 6(*a*), each unit is set by joining four adjacent pixels arranged in two rows and two columns. The large square of thick broken line surrounding four pixels in FIG. 6(*a*) represents a target unit of the four pixels, which is to be currently processed. For convenience of explanation, the four pixels constituting the target unit are identified as Pa (upper left pixel), Pb (upper right pixel), Pc (lower left pixel), and Pd (lower right pixel). The following description is on the assumption that each unit consists of four pixels arranged in two rows and two columns, although this arrangement is not restrictive in any sense. For example, each unit may consist of four adjoining pixels arranged as shown in FIG. 6(*b*). The number of pixels included in each unit is not restricted to 4. For example, each unit may consist of two pixels as shown in FIGS. 6(*c*) and 6(*d*).

Referring back to the flowchart of FIG. 5, the CPU 102 subsequently reads image data and a total diffused error with regard to each pixel included in the specified target unit (step S202). The image data read here is the tone data of the C, M, Y, and K colors, which have been subjected to the color conversion process (step S104 in the flowchart of FIG. 4). The total diffused error is the sum of divisions of tone errors, which arise in the tone number conversion process and are diffused from peripheral units to each pixel of the target unit. Since the read image data is the tone data of the C, M, Y, and K colors, the tone error arises with regard to each color component. The total diffused error is accordingly the sum of the tone data with regard to each color component. The method of diffusing a tone error arising in the tone number conversion process to peripheral pixels will be discussed later.

In this example, the target unit consists of the four pixels Pa, Pb, Pc, and Pd as shown in FIG. 6(*a*). The processing of step S202 in the flowchart of FIG. 5 reads image data DTa, DTb, DTc, and DTd and total diffused errors EDa, EDb, EDc, and EDd with regard to these four pixels Pa, Pb, Pc, and Pd. The data read for the target unit are stored in the RAM 106 of the computer 100.

After reading the image data and the total diffused errors of the respective pixels, the CPU 102 determines the dot on-off state of each pixel included in the target unit (step S204). In this example, the processing of step S204 determines the dot on-off state of the four pixels included in the target unit shown in FIG. 6(*a*) in a predetermined order. In the specification hereof, the process of determining the dot on-off state with regard to the respective pixels included in the target unit may be referred to as the 'intra-unit multi-valuing process'. The details of the intra-unit multi-valuing process will be discussed later.

The CPU 102 then diffuses a tone error, which arises in the target unit by the determination of the dot on-off state of each pixel included in the target unit, to peripheral unprocessed units (step S206). The tone error arising in the target unit represents a tone value difference between a tone value of image data to be expressed y the whole target unit and a tone value actually expressed by dot creation in the pixels of the target unit. The method of calculating the tone error arising in the target unit will be discussed later as part of the intra-unit multi-valuing process. The processing of step S206 diffuses this tone value difference as the tone error arising in the target unit to peripheral unprocessed units.

Figure 7:
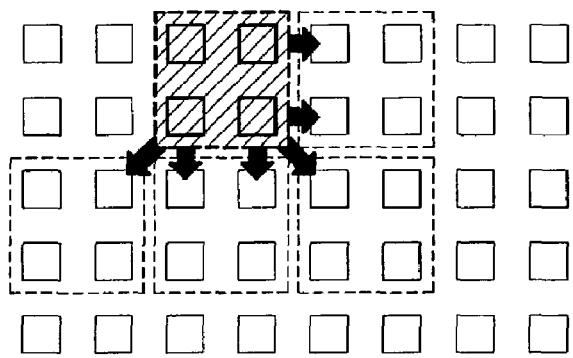
FIG. 7 conceptually illustrates diffusion of a tone error arising in a target unit to peripheral unprocessed units.

FIG. 7 conceptually illustrates diffusion of a tone error arising in a target unit to peripheral unprocessed units. Each of the small squares shown in FIG. 7 represents a pixel. The large square of thick broken line represents a target unit, and the large squares of thin broken line represent peripheral unprocessed units in the vicinity of the target unit. The tone error arising in the target unit is diffused to pixels included in the peripheral unprocessed units. The closed arrows extending from the target unit to peripheral six pixels in FIG. 7 show that the tone error arising in the target unit is diffused to the peripheral six pixels at a predetermined diffusion rate.

FIG. 8 shows examples of the diffusion rate of a tone error that arises in a target unit and is diffused to pixels included in peripheral unprocessed units in the vicinity of the target unit. The large square of thick broken line in FIG. 8 represents a target unit, and the large squares of thin broken line represent peripheral unprocessed units in the vicinity of the target unit. The small squares of thin solid line represent pixels in the peripheral unprocessed units, to which the tone error is diffused from the target unit.

Figure 8A:
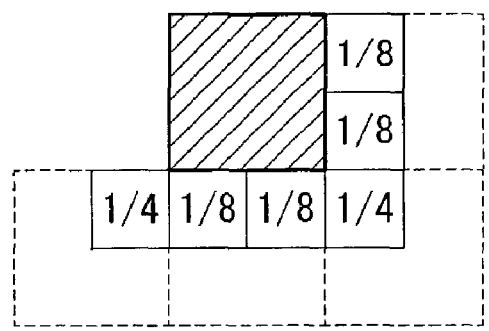
FIG. 8 shows examples of the diffusion rate of a tone error that arises in a target unit and is diffused to peripheral unprocessed pixels in the vicinity of the target unit.
Figure 8B:
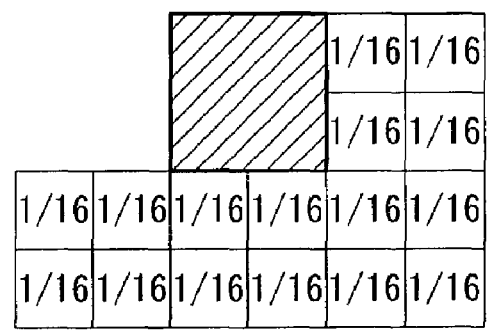

In the example of FIG. 8(a), ⅛ fractions of the tone error arising in the target unit are diffused respectively to two pixels on the right side of the target unit and two pixels on the lower side of the target unit, while ¼ fractions of the tone error are diffused respectively to a lower left pixel and a lower right pixel of the target unit. Diffusion of the tone error at this rate causes the ¼ fractions of the tone error arising in the target unit to be equally diffused to the peripheral unprocessed units in the vicinity of the target unit. In the example of FIG. 8(b), identical fractions of the tone error arising in the target unit are diffused to all the pixels included in the peripheral unprocessed units in the vicinity of the target unit. A preset fraction of the tone error arising in the target unit may collectively be diffused to only one pixel in each of the peripheral unprocessed units.

The processing of step S206 in the flowchart of FIG. 5 diffuses the tone error arising in the target unit to the peripheral unprocessed units as discussed above. On completion of the processing with regard to the target unit, the CPU 102 determines whether or not the processing has been completed for all the units included in the image (step S208). If there is any unprocessed unit, the program returns to step S200 and repeats the series of processing discussed above. When the processing has been completed for all the units, the program exits from the tone number conversion process by units.

The tone number conversion process by units has advantages over the tone number conversion process by pixels. Every time determining the dot on-off state of a certain pixel, the tone number conversion process by pixels should read the image data and the total diffused error stored corresponding to the certain pixel and diffuse the tone error arising in the certain pixel by the determination of the dot on-off state to peripheral unprocessed pixels. The tone number conversion process by pixels accordingly has a relatively long processing time. The tone number conversion process by units, on the other hand, reads the image data and the total diffused error with regard to each unit and writes the division of the arising tone error diffused to each peripheral unprocessed unit into the memory. The reading and writing operations by units desirably shortens the processing time.

D-2. Intra-Unit Multi-Valuing Process

Figure 9:
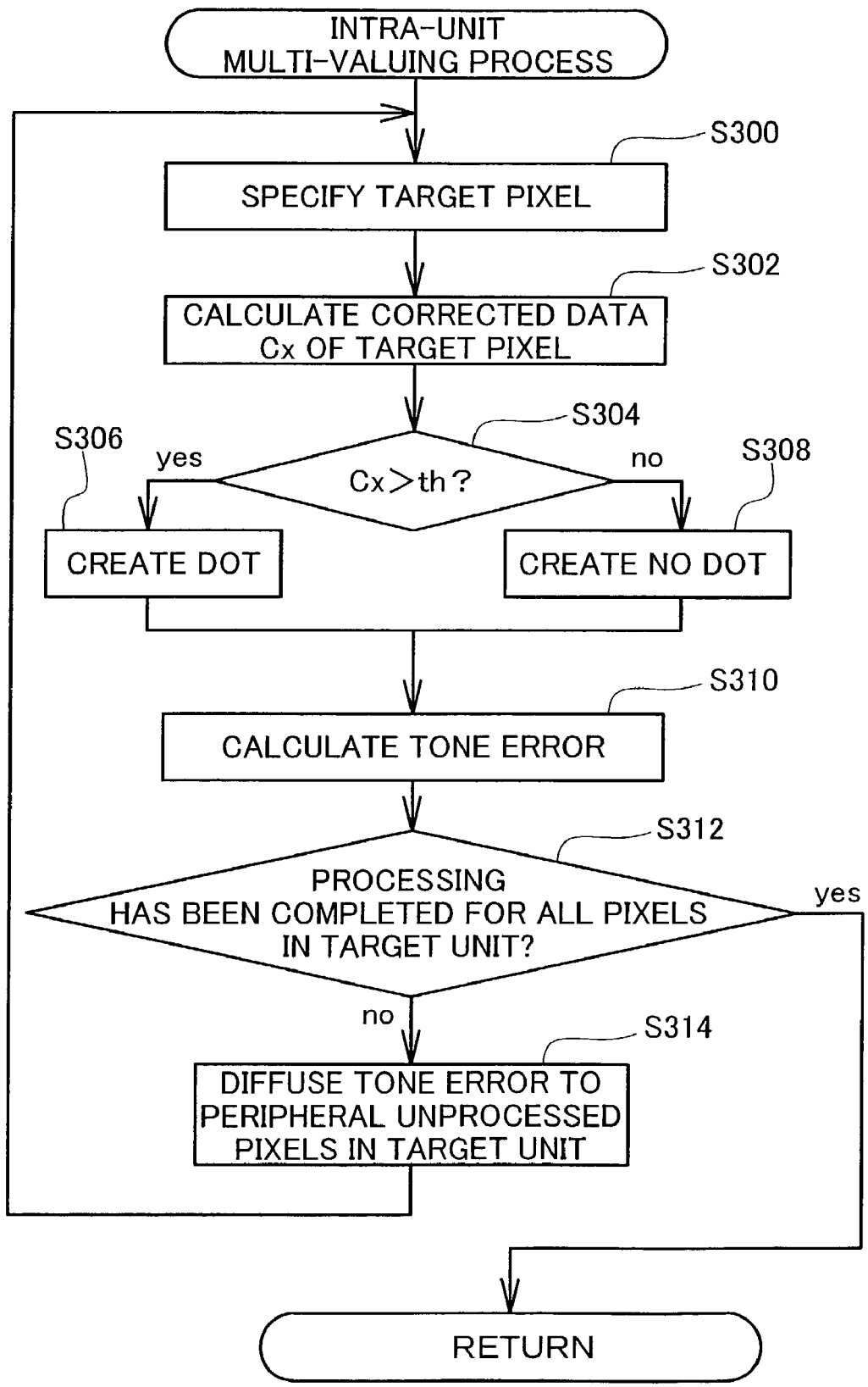
FIG. 9 is a flowchart showing a routine of intra-unit multi-valuing process, which determines the dot on-off state in each pixel of a target unit.

The following describes the intra-unit multi-valuing process (step S204 in the flowchart of FIG. 5), which is part of the tone number conversion process by units. FIG. 9 is a flowchart showing a routine of the intra-unit multi-valuing process.

When the program enters the intra-unit multi-valuing process, the CPU 102 first specifies one target pixel, which is the object of determination of the dot on-off state, among the pixels constituting the target unit (step S300). Each unit consists of multiple pixels as mentioned previously. The procedure successively determines the dot on-off state of the multiple pixels in a predetermined order. The processing of step S300 specifies one target pixel according to the predetermined order. In this example, determination of the dot on-off state is carried out in a specific order from the upper left pixel to the lower right pixel among the four pixels constituting the target unit shown in FIG. 6(a), that is, in an order of the pixel Pa, the pixel Pb, the pixel Pc, and the pixel Pd. The processing of step S300 first specifies the upper left pixel Pa as the target pixel.

The CPU 102 then calculates corrected data Cx of the specified target pixel (the pixel Pa in this example) (step S302). The corrected data Cx is obtained by adding the total diffused error diffused to and stored at the target pixel to the image data of the target pixel. The image data and the total diffused error of each pixel included in the target unit have already been read at step S202 in the tone number conversion process by units shown in the flowchart of FIG. 5. The processing of step S302 in the intra-unit multi-valuing process sums up the image data and the total diffused error of the target pixel among these data to determine the corrected data Cx.

The CPU 102 subsequently compares the calculated corrected data Cx of the target pixel (the pixel Pa in this example) with a preset threshold value th (step S304). When the corrected data Cx is greater than the threshold value th, it is determined that a dot is to be created in the target pixel (step S306). When the corrected data Cx is not greater than the threshold value th, on the other hand, it is determined that no dot is to be created in the target pixel (step S308). The result of the determination is stored as a variable representing the decision result with regard to each pixel.

The CPU 102 then calculates a tone error arising in the target pixel (the pixel Pa in this example) by the determination of the dot on-off state (step S310). The tone error is calculated by subtracting a tone value expressed in the target pixel by dot creation or non-dot creation (hereafter this tone value is referred to as the resulting value) from the corrected data Cx of the target pixel.

After the calculation of the tone error arising in the target pixel, the CPU 102 determines whether or not the processing has been completed for all the pixels in the target unit (step S312). When there is any unprocessed pixel in the target unit (in the case of a negative answer at step S312), the CPU 102 diffuses the tone error to the peripheral unprocessed pixels in the vicinity of the target pixel (step S314). The process of error diffusion is discussed below with reference to FIG. 10.

FIG. 10 shows a process of successively selecting a target pixel among the pixels in a target unit and determining the dot on-off state of the target pixel, so as to implement the determination of the dot on-off state collectively in each unit. The four squares in FIG. 10 represent pixels Pa, Pb, Pc, and Pd constituting a target unit. DTa and EDa included in the square of the pixel Pa show that the image data DTa and the total diffused error EDa are mapped to the pixel Pa and stored in the RAM 106. Similarly the image data DTb and the total diffused error EDb, the image data DTc and the total diffused error EDc, and the image data DTd and the total diffused error EDd are respectively mapped to the pixel Pb, the pixel Pc, and the pixel Pd and stored in the RAM 106.

Figure 10A:
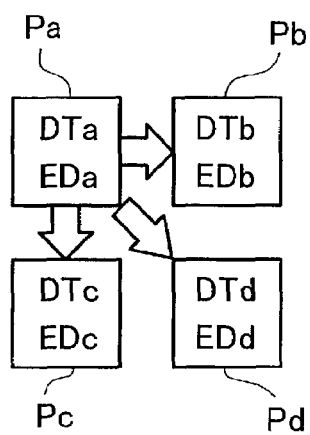
FIG. 10 conceptually shows a process of determining the dot on-off state in each target pixel of a target unit while diffusing a tone error arising in the target pixel to peripheral unprocessed pixels in the target unit.
Figure 10B:
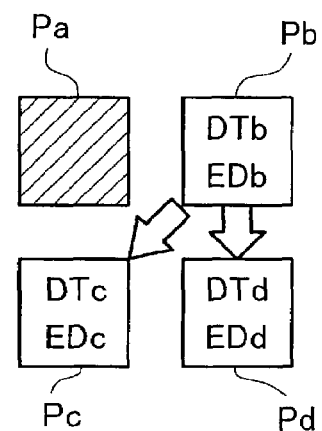
Figure 10C:
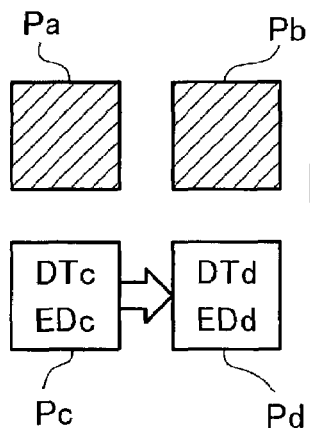
Figure 10D:
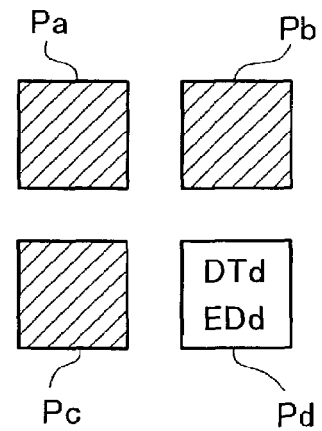

As mentioned above, the pixel Pa among these four pixels is specified as the first target pixel. The procedure reads the image data and the total diffused error of the target pixel Pa, calculates the corrected data Cx of the target pixel Pa, and compares the calculated corrected data Cx with the preset threshold value th to determine the dot on-off state of the target pixel Pa. At the time when the determination of the dot on-off state is concluded with regard to the pixel Pa, the three pixels Pb, Pc, and Pd remain as unprocessed pixels in the target unit as shown in FIG. 10(a). The procedure diffuses ⅓ fractions of the tone error arising in the pixel Pa equally to these three pixels, and adds the fraction to the total diffused error accumulated in each pixel. For example, the total diffused error EDb is stored at the pixel Pb as shown in FIG. 10(a). The ⅓ fraction of the tone error arising in the pixel Pa is diffused to the pixel Pb and is added to the total diffused error EDb. The total diffused error EDb is accordingly updated to the sum of the total diffused error EDb originally stored at the pixel Pb and the fraction of the tone error diffused from the pixel Pa and is newly stored corresponding to the pixel Pb.

This series of processing is also carried out for the other pixels Pc and Pd. The total diffused error EDc is updated to the sum of the total diffused error EDc originally stored at the pixel Pc and the fraction of the tone error diffused from the pixel Pa and is newly stored corresponding to the pixel Pc. The total diffused error EDd is updated to the sum of the total diffused error EDd originally stored at the pixel Pd and the fraction of the tone error diffused from the pixel Pa and is newly stored corresponding to the pixel Pd. The open arrows extending from the pixel Pa toward the other three pixels in FIG. 10(*a*) show diffusion of the tone error arising in the pixel Pa to these three pixels. It is not necessary to diffuse equal fractions of the tone error to peripheral unprocessed pixels. Divisions of the tone error with preset weights may be diffused to the peripheral unprocessed pixels.

Referring back to the flowchart of FIG. 9, after the diffusion of the tone error arising in the first target pixel Pa to the peripheral unprocessed pixels in the target unit, the program returns to step S300 to specify a new target pixel. Since the pixel Pa in the target unit has already been processed, this time the CPU 102 specifies the pixel Pb on the right side of the pixel Pa as a new target pixel at step S300. The newly specified target pixel Pb is subjected to the series of processing discussed above. The difference from the processing with regard to the pixel Pa is discussed briefly.

As in the case of the previous target pixel Pa, the CPU 102 calculates the corrected data Cx of the new target pixel Pb (step S302). The total diffused error EDb has been updated to the sum of the total diffused error EDb originally stored at the pixel Pb and the fraction of the tone error diffused from the pixel Pa and has newly been stored corresponding to the pixel Pb. The corrected data Cx of the pixel Pb is accordingly obtained by summing up the image data DTb and the updated total diffused error EDb of the target pixel Pb. The calculated corrected data Cx of the target pixel Pb is compared with the preset threshold value th (step S304). When the corrected data Cx is greater than the threshold value th, it is determined that a dot is to be created in the pixel Pb (step S306). Otherwise it is determined that no dot is to be created in the pixel Pb (step S308). The CPU 102 subsequently calculates the tone error arising in the pixel Pb (step S310). As in the case of the pixel Pa, the tone error arising in the target pixel Pb is calculated by subtracting the resulting value from the corrected data Cx of the pixel Pb.

After the calculation of the tone error arising in the target pixel Pb, the CPU 102 determines whether or not the processing has been completed for all the pixels in the target unit (step S312). If there is any unprocessed pixel, the CPU 102 diffuses the calculated tone error to the peripheral unprocessed pixels (step S314). Since the pixel Pa in the target unit has already been processed, the two pixels Pc and Pd remain as unprocessed pixels in the target unit at this moment. The tone error arising in the pixel Pb is accordingly diffused to these two pixels. The process of diffusing the tone error from the pixel Pb is discussed with reference to FIG. 10.

FIG. 10(*b*) conceptually shows diffusion of the tone error arising in the pixel Pb. The hatched square of the pixel Pa shows that the pixel Pa has already been processed. At the time when the determination of the dot on-off state is concluded with regard to the pixel Pb, the two pixels Pc and Pd remain as unprocessed pixels in the target unit. The procedure diffuses ½ fractions of the tone error arising in the pixel Pb equally to these two pixels Pc and Pd. The open arrows extending from the pixel Pb toward the pixels Pc and Pd in FIG. 10(*b*) show diffusion of the tone error arising in the pixel Pb to these pixels. The total diffused error accumulated in each pixel is then updated to the sum of the total diffused error originally stored at the pixel and the fraction of the diffused tone error. It is not necessary to diffuse equal fractions of the tone error to peripheral unprocessed pixels in the target unit. Divisions of the tone error with preset weights may be diffused to the peripheral unprocessed pixels.

After the diffusion of the tone error arising in the pixel Pb to the peripheral unprocessed pixels, the program again returns to step S300 in the flowchart of FIG. 9 to shift the target pixel to the pixel Pc and carries out the above series of processing for the new target pixel Pc. The processing is discussed briefly with reference to FIGS. 9 and 10(*c*). The procedure first sums up the image data DTc and the total diffused error EDc of the newly specified target pixel Pc to calculate the corrected data Cx (step S302). At the time of starting the processing for the pixel Pc, the total diffused error EDc accumulated in the pixel Pc has been updated to the sum of the total diffused error EDc originally stored at the pixel Pc, the fraction of the tone error diffused from the pixel Pa, and the fraction of the tone error diffused from the pixel Pb. The procedure thus sums up the updated total diffused error EDc and the image data DTc of the target pixel Pc to calculate the corrected data Cx. The dot on-off state of the target pixel Pc is determined, based on the result of comparison between the calculated corrected data Cx and the preset threshold value th (steps S304 through S308). At the time when the determination of the dot on-off state is concluded with regard to the pixel Pc, only one pixel Pd remains as a unprocessed pixel in the target unit as shown in FIG. 10(*c*). The whole tone error arising in the pixel Pc is accordingly diffused to the pixel Pd and is added to the total diffused error EDd originally stored at the pixel Pd (steps S310 through S314). The total diffused error EDd accumulated in the pixel Pd is thus updated to the sum.

After the diffusion of the tone error arising in the pixel Pc to the peripheral unprocessed pixel, the program again returns to step S300 in the flowchart of FIG. 9 to shift the target pixel to the pixel Pd and carries out the above series of processing for the new target pixel Pd. The procedure sums up the image data DTd of the newly specified target pixel Pd and the updated total diffused error EDd stored corresponding to the pixel Pd to calculate the corrected data Cx (step S302). The calculated corrected data Cx is compared with the preset threshold value th (step S304). When the corrected data Cx is greater than the threshold value th, it is determined that a dot is to be created in the target pixel Pd (step S306). Otherwise it is determined that no dot is to be created in the target pixel Pd (step S308).

After the determination of the dot on-off state of the target pixel Pd, the procedure calculates the tone error arising in the pixel Pd (step S310) and determines whether or not the processing has been completed for all the pixels in the target unit (step S312). At the time of starting the processing for the pixel Pd, no unprocessed pixel remains in the target unit as shown in FIG. 10(*d*). After conclusion of the processing for the pixel Pd, it is thus determined at step S312 that the processing has been completed for all the pixels in the target unit. The program accordingly exits from the intra-unit multi-valuing process shown in the flowchart of FIG. 9 and returns to the tone number conversion process by units shown in the flowchart of FIG. 5. After the intra-unit multi-valuing process, the tone number conversion process by units shown in FIG. 5 diffuses the tone error arising in the target unit to peripheral unprocessed units (step S206).

The value of the tone error with regard to the pixel Pd calculated at step S310 in the intra-unit multi-valuing process of FIG. 9 is set to the tone value arising in the target unit. The procedure sequentially determines the dot on-off state of each target pixel in the target unit, while diffusing the tone error arising in the target pixel to the peripheral unprocessed pixels in the target unit. The tone error arising in the target unit is thus accumulated as the total diffused error EDd in the last target pixel Pd. This is described in detail with reference to FIG. 10.

The tone error arising in the pixel Pa is diffused to the three unprocessed pixels Pb, Pc, and Pd in the target unit. The dot on-off state of the pixel Pb is determined to cancel the total diffused error accumulated in the pixel Pb as much as possible by considering the fraction of the tone error diffused from the pixel Pa. If the determination of the dot on-off state of the pixel Pb succeeds in canceling the total diffused error accumulated in the pixel Pb, no tone error arises in the pixel Pb and no fractions of the tone error are diffused from the pixel Pb to the pixels Pc and Pd. Similarly, if the determination of the dot on-off state of the other two pixels Pc and Pd succeeds in canceling the total diffused errors accumulated in these pixels Pc and Pd, no tone error arises in these pixels Pc ad Pd. In this case, the tone error arising in the pixel Pa is cancelled by the peripheral pixels Pb, Pc, and Pd, so that there is no tone error arising in the target unit.

When the determination of the dot on-off state of the pixel Pb causes a new tone error in the pixel Pb, on the other hand, the newly arising tone error is diffused from the pixel Pb to the peripheral unprocessed pixels Pc and Pd. The pixels Pc and Pd accordingly receive the diffused divisions of the tone error arising in the pixel Pa and the tone error arising in the pixel Pb. If the determination of the dot on-off state of the pixels Pc and Pd succeeds in canceling the total diffused errors accumulated in these pixels Pc and Pd, however, there is still no tone error arising in the target unit.

The determination of the dot on-off state of the pixel Pc may fail to cancel the total diffused error accumulated in the pixel Pc. In this case, if the determination of the dot on-off state of the pixel Pd succeeds in canceling the total diffused error accumulated in the pixel Pd, there is still no tone error arising in the target unit. Namely the total diffused error that is not cancelled but remains in the pixel Pd is the tone error arising in the whole target unit. The arrangement successively determines the dot on-off state of each target pixel in the target unit, while diffusing the tone error arising in the target pixel to the peripheral unprocessed pixels in the target unit. This causes the tone error, which is not cancelled but remains in each target pixel, to be accumulated in a subsequent pixel. The tone error arising in the pixel Pd, which is the last target pixel in the target unit, can thus be used as the tone error arising in the whole target unit.

The above procedure sets the value of the tone error arising in the last target pixel Pd in the target unit to the tone value arising in the whole target unit. One modified procedure may calculate the tone error arising in each of the pixels constituting the target unit and set the summation of the calculated tone errors to the tone error arising in the whole target unit.

In the example of FIG. 10, the determination of the dot on-off state is carried out in the order of the pixel Pa, the pixel Pb, the pixel Pc, and pixel Pd among the four pixels constituting the target unit. This order is, however, not restrictive in any sense. For example, the determination of the dot on-off state may be carried out in a different order of the pixel Pa, the pixel Pc, the pixel Pb, and the pixel Pd. The order of specifying the target pixel in the target unit may be any order that attains the favorable picture quality of the resulting image.

D-3. Intra-Unit Multi-Valuing Process of First Embodiment

As described above, the tone number conversion process by units repeats the same series of processing for the respective units. The pixel position that has been determined as the dot-on pixel in a certain unit is apt to be determined again as the dot-on pixel in a subsequent unit. In another case, dots are created in a periodical manner at a cycle of multiple units, while the dot-on pixel position is not fixed in these multiple units. Especially in an area of identical image data, substantially the same series of processing is repeated at a cycle of multiple units. Dots may then be created at identical pixel positions in the respective units in a periodical manner. The size of each dot is unrecognizably small. Formation of dots in the periodical pattern at the cycle of multiple units, however, causes the presence of such an area to be visually recognizable. This may worsen the picture quality of the resulting image.

In order to prevent the occurrence of such a problem, the intra-unit multi-valuing process of the first embodiment, which is part of the process of image data conversion into dot data by units, detects dot-on pixel positions, at which a dot is to be created, in previous processed units and determines the dot on-off state of the respective pixels in a current target unit based on the results of detection. The arrangement of determining the dot on-off state in each target unit based on the record of the dot-on pixel positions in the previous processed units effectively prevents the picture quality of the resulting image from being worsened by the conversion of image data into dot data by units. This arrangement is discussed below as the intra-unit multi-valuing process of the first embodiment.

Figure 11:
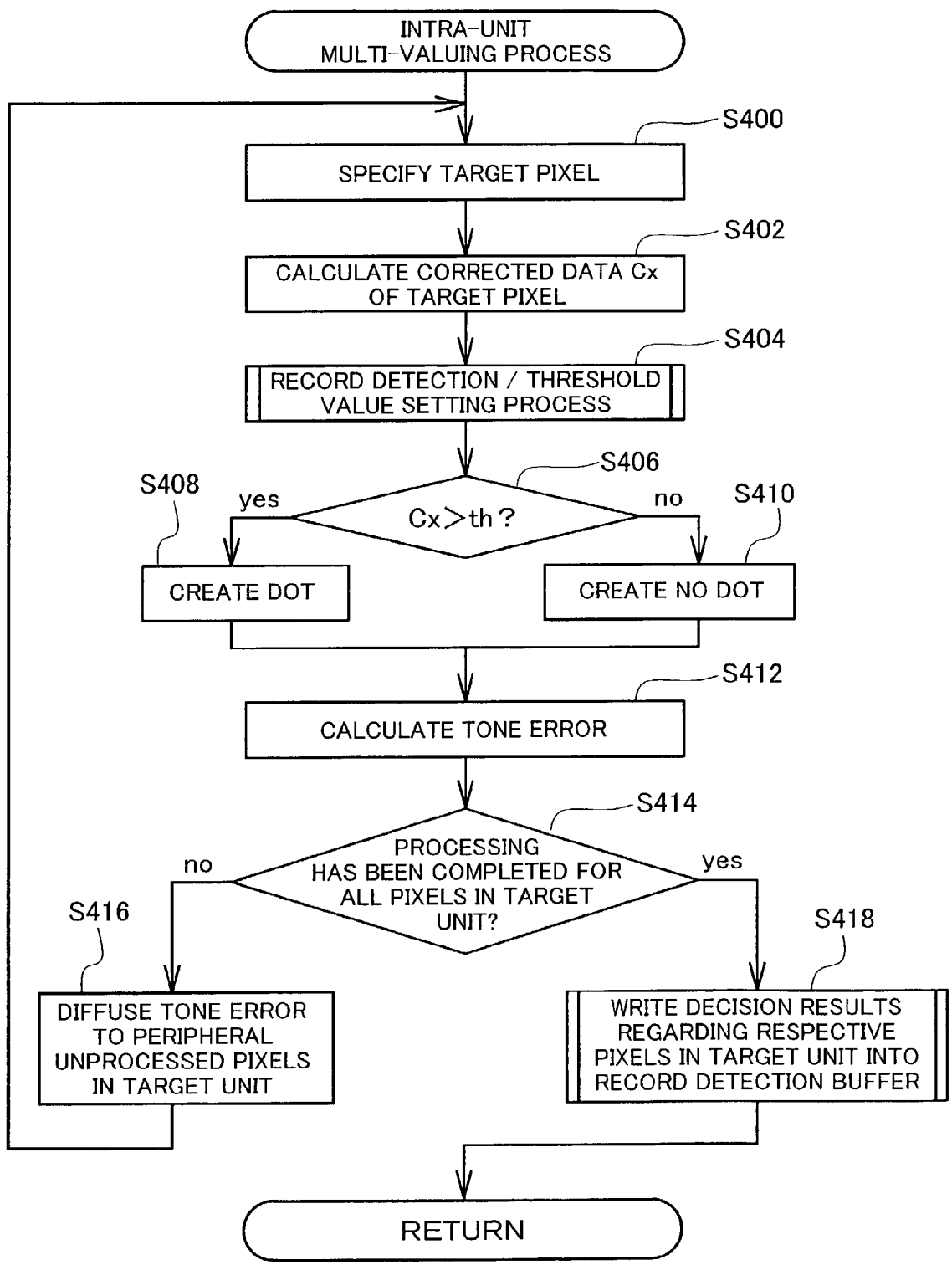
FIG. 11 is a flowchart showing a routine of the intra-unit multi-valuing process, which determines the dot on-off state in each pixel of a target unit, in a first embodiment of the invention.

FIG. 11 is a flowchart showing a routine of the intra-unit multi-valuing process executed in the first embodiment. The primary difference from the general intra-unit multi-valuing process discussed above with reference to the flowchart of FIG. 9 is to detect the dot-on pixel positions in the previous processed units and carry out the tone number conversion process based on the results of detection. The intra-unit multi-valuing process of the first embodiment is discussed below with a focus on the difference from the general intra-unit multi-valuing process.

When the program enters the intra-unit multi-valuing process of the first embodiment, the CPU 102 first specifies a target pixel in the target unit (step S400) and calculates the corrected data Cx of the specified target pixel (step S402). The corrected data Cx is obtained by summing up the image data of the target pixel and the total diffused error accumulated in the target pixel. The image data and the total diffused error of each pixel included in the target unit have already been read at step S202 in the tone number conversion process by units shown in the flowchart of FIG. 5. The processing of step S402 sums up the image data and the total diffused error of the target pixel among these data to determine the corrected data Cx.

The intra-unit multi-valuing process of the first embodiment then detects a record of dot-on pixel positions in previous processed units and sets an adequate value to the threshold value th based on the results of detection (step S404). This record detection/threshold value setting process is described in detail with reference to the flowchart of FIG. 12.

Figure 12:
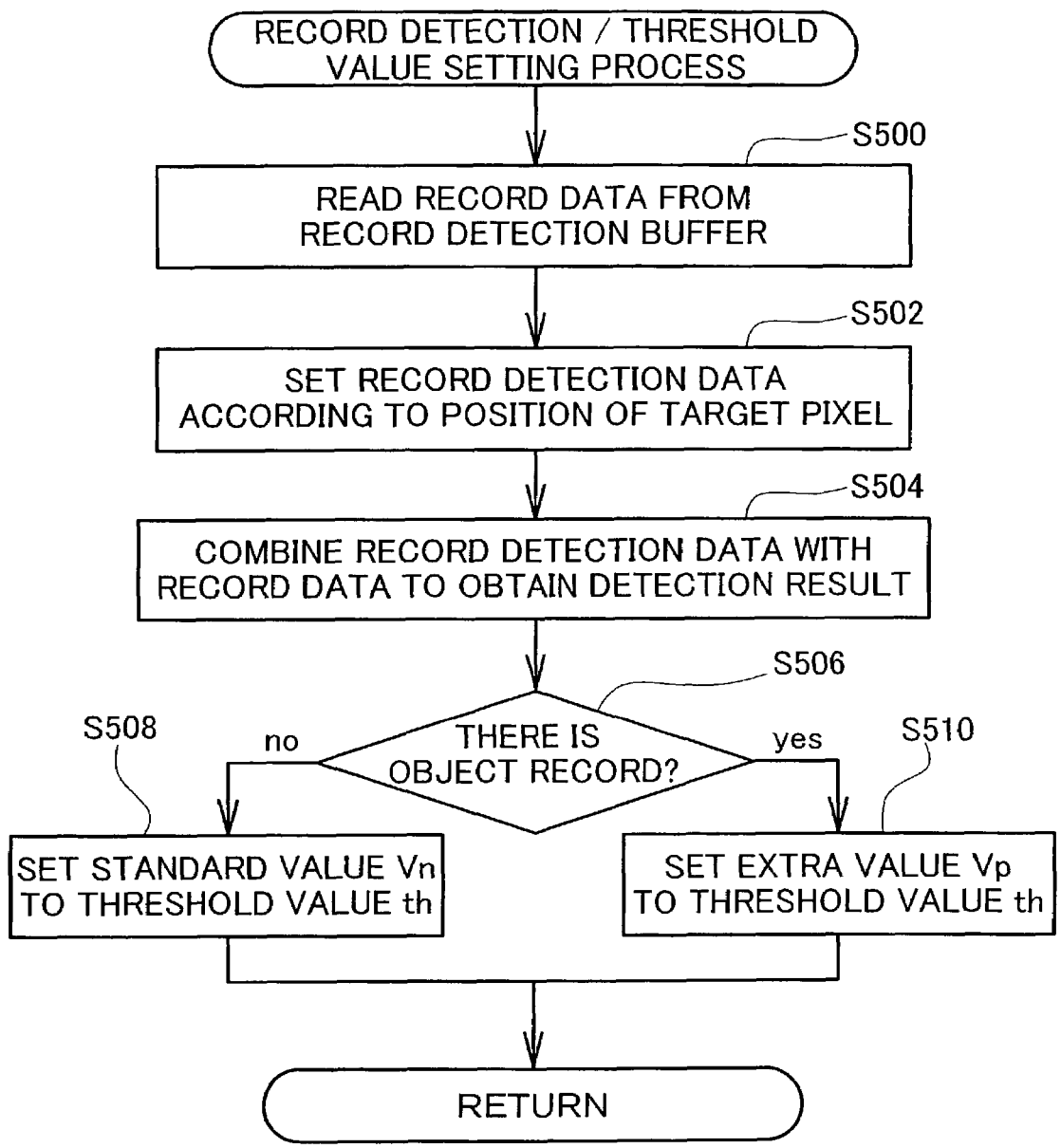
FIG. 12 is a flowchart showing a routine of record detection/threshold value setting process, which detects the status of dot creation in a preset number of processed units and sets a threshold value based on the detection result, in the intra-unit multi-valuing process of the first embodiment.

FIG. 12 is a flowchart showing a routine of the record detection/threshold value setting process. When the program enters the record detection/threshold value setting process, the CPU 102 first reads record data (step S500). The record data shows dot-on pixel positions, at which a dot is to be created, in previous processed units, and is stored in an exclusive buffer (record detection buffer) defined in a specific area on the RAM 106.

Figure 13A:
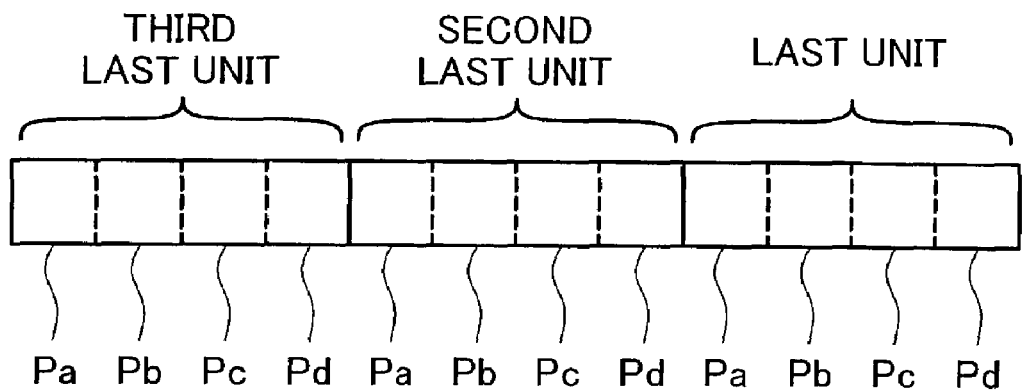
FIG. 13 conceptually shows the structure of record data read in the record detection/threshold value setting process of the first embodiment.
Figure 13B:
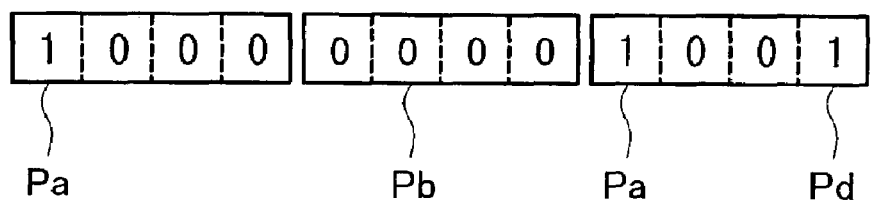
Figure 13C:
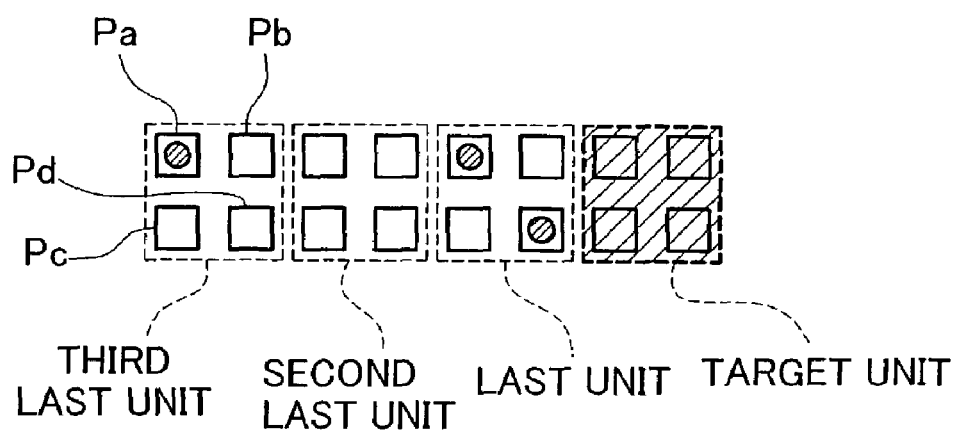
Figure 14A:
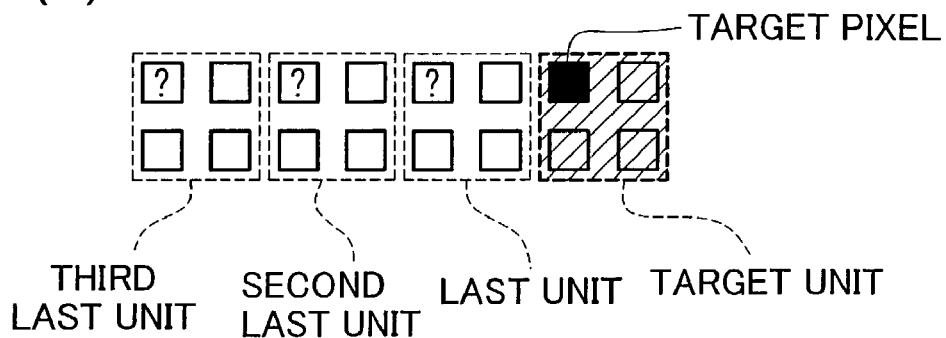
FIG. 14 conceptually shows the structure of record detection data set for detection of an object record in the record detection/threshold value setting process of the first embodiment.
Figure 14B:
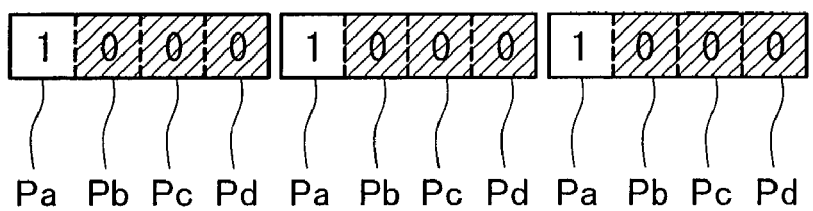
Figure 14C:
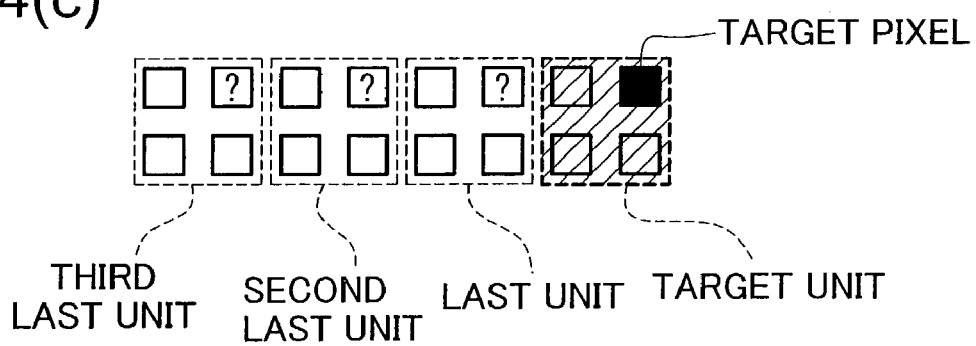
Figure 14D:
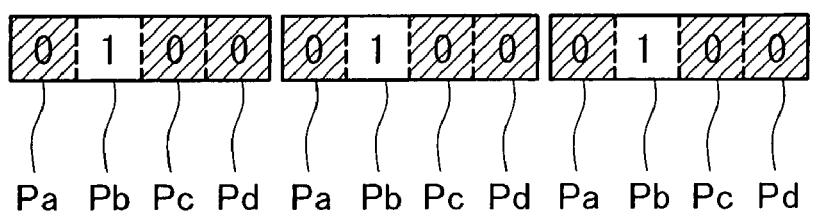

FIG. 13(*a*) conceptually shows the structure of the record data. The record data shown in FIG. 13(*a*) has a length of 12 bits, where each bit corresponds to one pixel position. One unit consists of four pixels in this example, so that the 12-bit record data includes data regarding pixels of three units. The following description is on the assumption that the record data includes data of three units. This data length is, however, not restrictive at all, but the record data may include data regarding a greater number of units.

As shown in FIG. 13(*a*), the record data has three blocks, where each block consists of four consecutive bits. The three blocks from the lower bit (from the right side in the drawing) respectively correspond to a unit processed immediately before the current target unit (last unit), a unit processed immediately before the last unit (second last unit), and a unit processed immediately before the second last unit (third last unit). The four bits in each block from the lower bit respectively correspond to the lower right pixel (pixel Pd), the lower left pixel (pixel Pc), the upper right pixel (pixel Pb), and the upper left pixel (pixel Pa) in the corresponding unit. Setting a value '1' to a certain bit in the record data represents that a dot is to be created in the pixel corresponding to the certain bit. Setting a value '0' to the certain bit, on the contrary, represents that no dot is to be created in the pixel corresponding to the certain bit.

In the example of FIG. 13, one block consists of four bits, since one unit consists of four pixels (see FIG. 6(*a*)). When one unit consists of N pixels, one block in the record data consists of N consecutive bits. In this example, the record data has the length of 12 bits. When each unit consists of N pixels and the status of dot creation is to be detected up to a unit processed M units prior to the current target pixel, the record data has a length of N×M bits.

For example, in a lower 4-bit group of the record data shown in FIG. 13(*b*), the value '1' is set to the upper-most (left-end) bit and the lower-most (right-end) bit, while the value '0' is set to the other two bits. This means that a dot is created at the positions of the two pixels Pa and Pd, while no dot is created at the other two pixel positions, in the last unit or the unit processed immediately before the current target unit as shown in FIG. 13(*c*). In an intermediate 4-bit group of the record data shown in FIG. 13(*b*), the value '0' is set to all the four bits. This means that no dot is created at any of the four pixel positions in the second last unit that is processed two units before the current target unit as shown in FIG. 13(*c*). In an upper 4-bit group of the record data shown in FIG. 13(*b*), the value '1' is set to the upper-most bit, while the value '0' is set to the other three bits. This means that a dot is created at the position of the pixel Pa, while no dot is created at the other three pixel positions, in the third last unit that is processed three units before the current target unit as shown in FIG. 13(*c*). In this manner, the record data of FIG. 13(*b*) suggests the dot on-off conditions of FIG. 13(*c*).

Referring back to the flowchart of FIG. 12, after reading the record data from the record detection buffer defined in the specific area on the RAM 106 at step S500, the CPU 102 sets record detection data (step S502). The details of the setting are discussed below with reference to FIG. 14.

FIG. 14 conceptually shows the setting of the record detection data. In this example, the dot on-off state is to be determined with regard to the pixel Pa in the target unit. The large hatched square of thick broken line in FIG. 14(*a*) represents a target unit that is being currently processed. The closed square in the target unit represents a target pixel. As described above, the intra-unit multi-valuing process determines the dot on-off state of the respective pixels collectively in each unit. This may result in creation of dots at identical pixel positions in adjacent units. The reason of such phenomenon is discussed below.

Here it is assumed that a currently processed image area is an image data area of relatively low tone values (bright image area), where dots are created at a rate of 1 dot-on pixel per 36 pixels. In this image area, one dot is formed in substantially every square of 36 pixels (6 pixels in length by 6 pixels in width). The dot on-off state is determined in each unit of this image area, where each unit consists of 4 pixels (2 pixels in length by 2 pixels in width). In this case, the same series of processing is repeated at a cycle of 3 units (corresponding to 6 pixels in each side). Dots may thus be created at identical pixel positions in every third unit.

In the example of FIG. 14(*a*), the procedure determines whether or not a dot has been created at the position of the pixel Pa in the last, the second last, and the third last units prior to the current target unit. The mark '?' given to the pixel Pa in the respective units in FIG. 14(*a*) represents that detection of the status of dot creation is required at this pixel position.

FIG. 14(*b*) conceptually shows the record detection data set to detect the status of dot creation at this pixel position. Like the record data shown in FIG. 13, the record detection data has a length of 12 bits and includes three 4-bit groups. The record detection data has the three groups, since the status of dot creation is to be detected with regard to the previous three units in this example. Each group consists of four bits, since the processing is carried out collectively in each unit of four pixels. The mapping of the respective groups of the record detection data to the units and the mapping of the respective bits to the pixel positions in each unit are identical with those in the record data shown in FIG. 13. In this example, the length of the record detection data is identical with the length of the record data shown in FIG. 13. Such setting is, however, not restrictive at all. The length of the record detection data may alternatively be different from that of the record data.

In this example, the status of dot creation is to be detected at the position of the pixel Pa in the respective units as shown in FIG. 14(*a*). In the record detection data, a value '1' is set to only one bit corresponding to the pixel Pa in each unit, whereas a value '0' is set to the other three bits as shown in FIG. 14(*b*).

In the case where the pixel Pb is the target pixel, the procedure determines whether or not a dot has been created at the position of the pixel Pb in the last, the second last, and the third last units prior to the current target unit. FIG. 14(*c*) shows the pixel position, at which the status of dot creation is to be detected, in the respective units in the case of setting the pixel Pb to the target pixel. The mark '?' given to the pixel Pb in the respective units represents that detection of the status of dot creation is required at this pixel position. FIG. 14(*d*) conceptually shows the record detection data set to detect the status of dot creation at this pixel position. In the record detection data of FIG. 14(*d*), the value '1' is set to only one bit corresponding to the pixel Pb in each unit, whereas the value '0' is set to the other three pixels.

In this manner, the processing of step S502 in the flowchart of FIG. 12 sets the record detection data according to the position of the target pixel.

After setting the record detection data, the CPU 102 combines the record detection data with the record data read at step S500, so as to detect the status of dot creation at an object pixel position (step S504). Hereafter the status of dot creation at the object pixel position to be detected based on the setting of the record detection data may be referred to as the 'object record'.

Figure 15A:
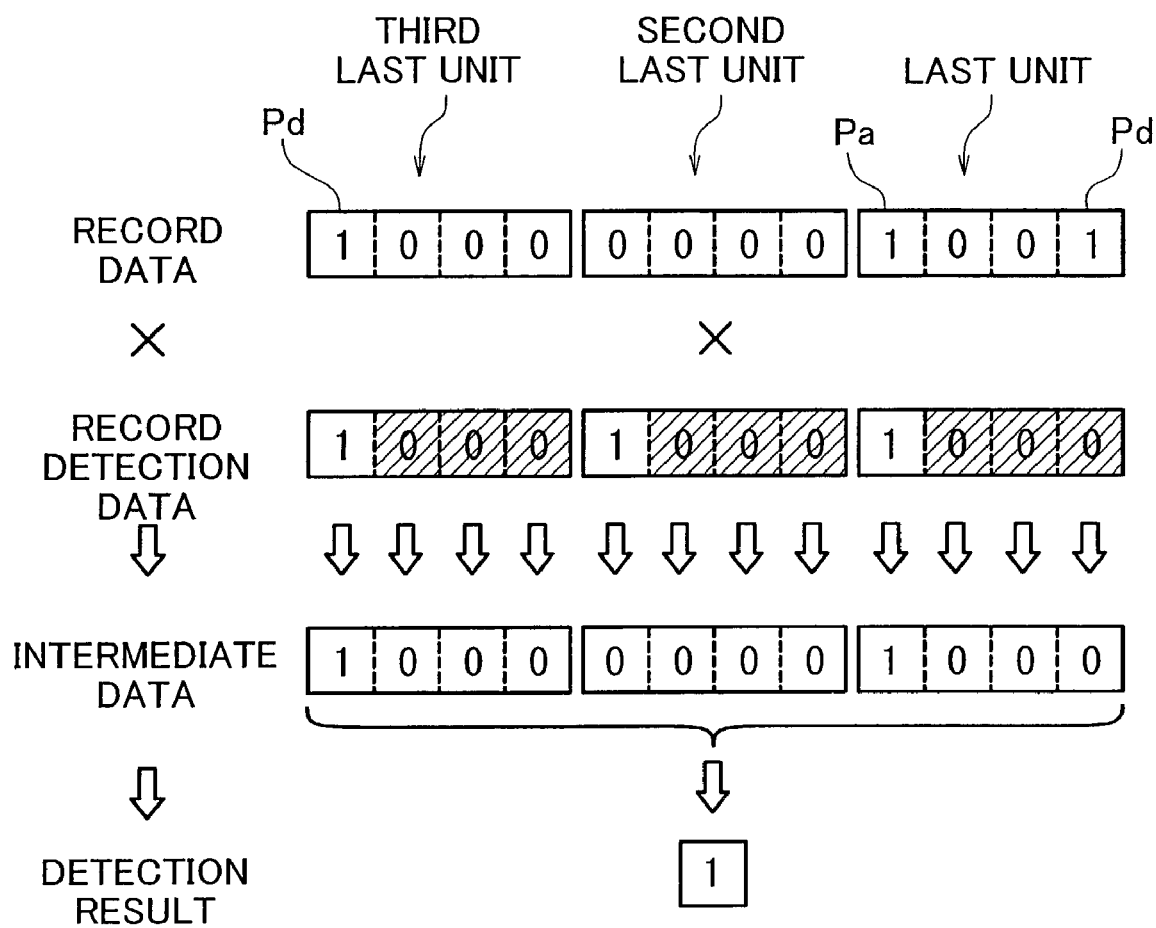
FIG. 15 conceptually shows detection of an object record by combining the record data with the record detection data in the record detection/threshold value setting process of the first embodiment.

FIG. 15(a) conceptually shows the process of combining the record detection data with the record data to determine the presence or absence of the object record. The first row in FIG. 15(a) shows the record data, and the second row shows the record detection data. The procedure of detecting the object record first calculates the logical product of the corresponding bits in the record data and the record detection data to generate intermediate data. The procedure then calculates the logical sum of the respective bits of the intermediate data to determine the presence or absence of the object record. In the specification hereof, the operation of 'combining the record detection data with the record data' calculates the logical product of the corresponding bits in the record data and the record detection data to generate the intermediate data. The intermediate data generated by combining the record detection data with the record data is shown below the record detection data in FIG. 15(a). As discussed previously, in the record detection data, the value '1' is set to only the object pixel position in each unit, whereas the value '0' is set to the other pixel positions. The calculated logical product of the corresponding bits in the record data and the record detection data accordingly sets a value '1' to the bit corresponding to the object pixel position only when a dot has been created at the object pixel position.

This series of processing is described concretely with regard to the 'last unit' shown in FIG. 15(a). The record data shows that dots have been created in the pixels Pa and Pd in the last unit prior to the current target unit. The object pixel position, for which the status of dot creation is to be detected, is only the position of the pixel Pa as defined by the record detection data. In the intermediate data with regard to the last unit, only one bit corresponding to the pixel Pa has the value '1' while the other three bits have the value '0' as shown in FIG. 15(a). Setting of the value '1' to any bit in the intermediate data of each unit means that a dot has been created at the object pixel position in the unit. The procedure analyzes the value of each bit included in the intermediate data and thereby determines whether or not a dot has been created at the object pixel position in each unit.

The processing of step S504 in the flowchart of FIG. 12 calculates the logical sum of the respective bits of the intermediate data as a detection result. The CPU 102 then determines if there is the object record, based on the detection result (step S506). The detection result equal to the value '0' represents the absence of the object record. When the value of the detection result (the logical sum of the respective bits of the intermediate data) is equal to '0', this means that no dot has been created at the object pixel position in any of the processed units defined as the object of detection. The detection result equal to the value '1', on the contrary, represents the presence of the object record. This means that a dot has been created at the object pixel position in at least one of the processed units defined as the object of detection.

In the intermediate data of FIG. 15(a), the value '1' is set to the bits in the 'last unit' and the 'third last unit'. The detection result calculated as the logical sum of the respective bits of the intermediate data is accordingly equal to the value '1'. This represents the presence of the object record.

Figure 15B:
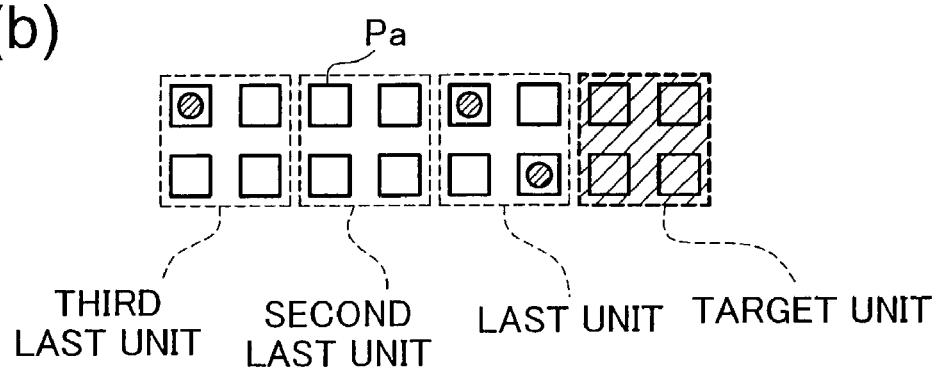

For the purpose of reference, FIG. 15(b) shows the status of dot creation specified by the record data of FIG. 15(a). The detection result calculated from the intermediate data is equal to '1' as shown in FIG. 15(a). This means that a dot has been created at the position of the pixel Pa. Dots are actually created at the position of the pixel Pa in the 'last unit' and the 'third last unit' prior to the current target unit as shown in FIG. 15(b). This proves the accurate detection of the status of dot creation by combining the record detection data with the record data.

The record detection/threshold value setting process shown in the flowchart of FIG. 12 then sets an adequate value to the threshold value th according to the presence or absence of the object record. In the absence of the object record at step S506, a standard value Vn is set to the threshold value th (step S508). In the presence of the object record at step S506, on the other hand, an extra value Vp, which is greater than the standard value Vn, is set to the threshold value th (step S510). The threshold value th is referred to at the subsequent step for determination of the dot on-off state in the target pixel in the intra-unit multi-valuing process. On completion of the setting of the threshold value th, the program exits from the record detection/threshold value setting process shown in the flowchart of FIG. 12 and returns to the intra-unit multi-valuing process of the first embodiment shown in the flowchart of FIG. 11.

The CPU 102 compares the corrected data Cx calculated at step S402 with the threshold value th (step S406). The adequate value has been set to the threshold value th, based on the presence or absence of the object record in the record detection/threshold value setting process discussed above. When the corrected data Cx is greater than the threshold value th (in the case of an affirmative answer at step S406), it is determined that a dot is to be created in the target pixel (step S408). When the corrected data Cx is not greater than the threshold value th (in the case of a negative answer at step S406), on the other hand, it is determined that no dot is to be created in the target pixel (step S410). As discussed above with reference to the flowchart of FIG. 12, in the presence of the object record, the threshold value th is changed to the extra value Vp, which is greater than the standard value Vn. This lowers the chance of creating a dot in the target pixel, when there is the object record. The result of the determination is stored as a variable representing the decision result with regard to each pixel.

The CPU 102 subsequently calculates a tone error arising in the target pixel by the determination of the dot on-off state (step S412). The method of calculating the tone error at step S412 is identical with the method adopted in the intra-unit multi-valuing process discussed above with reference to the flowchart of FIG. 9. The CPU 102 then determines whether or not the processing has been completed for all the pixels in the target unit (step S414). When there is any unprocessed pixel in the target unit (in the case of a negative answer at step S414), the CPU 102 diffuses the tone error to the peripheral unprocessed pixels in the target unit (step S416). The program then returns to step S400 to specify a next target pixel and repeats the series of processing for the next target pixel. The method of diffusing the tone error to the peripheral unprocessed pixels in the target unit at step S416 is identical with the method adopted in the intra-unit multi-valuing process discussed above with reference to FIGS. 9 and 10.

When it is determined at step S414 that the processing has been completed for all the pixels in the target unit (that is, in the case of an affirmative answer at step S414), on the other hand, the decision results regarding the respective pixels in the target unit are written into the record detection buffer (step S416). This process is described below with reference to FIGS. 16 and 17.

Figure 16:
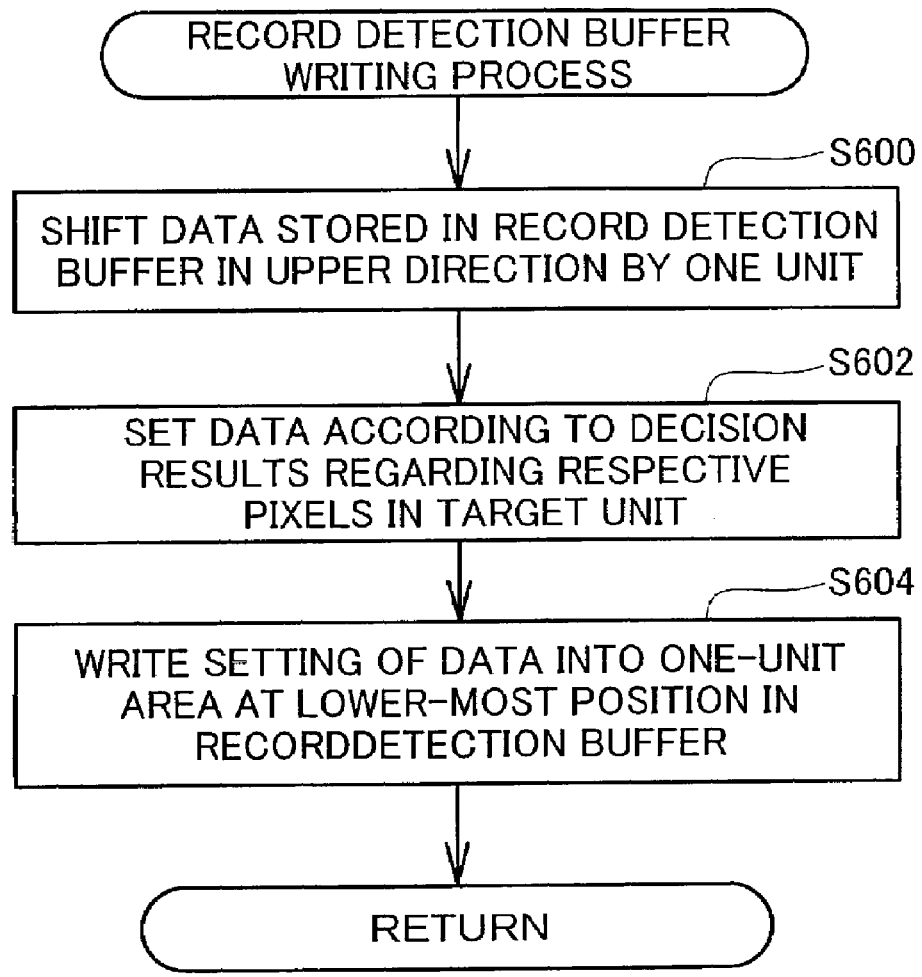
FIG. 16 is a flowchart showing a routine of record detection buffer writing process, which writes decision results regarding the dot on-off state of respective pixels in each unit into a record detection buffer storing the record data, in the record detection/threshold value setting process of the first embodiment.
Figure 17:
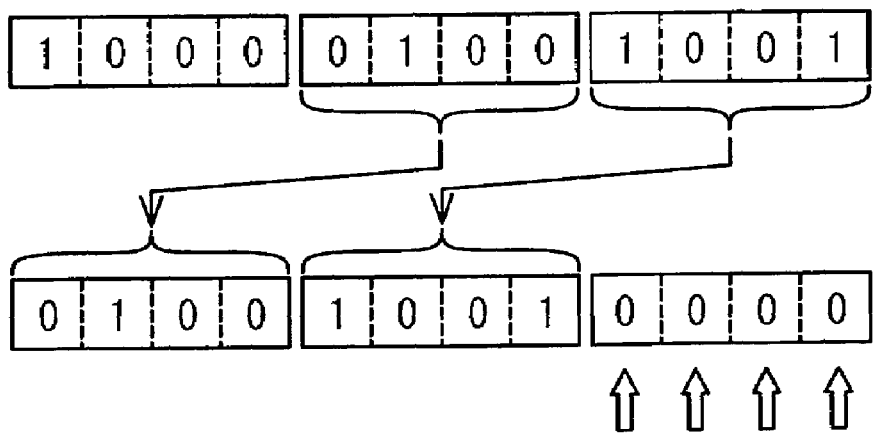
FIG. 17 conceptually shows a process of writing the decision results regarding the dot on-off state of the respective pixels in each unit into the record detection buffer storing the record data in the first embodiment.

FIG. 16 is a flowchart showing the process of writing the decision results regarding the respective pixels in the target unit into the record detection buffer. When the program enters the record detection buffer writing process, the CPU 102 first shifts the data stored in the record detection buffer in the upper direction by one unit (step S600). FIG. 17 shows this shifting operation. Each array of small squares represents the contents of the record detection buffer. The upper row shows the state before shifting the data, and the lower row shows the state after shifting the data. The processing of step S600 in the flowchart of FIG. 16 shifts the data stored in the record detection buffer in the upper direction by one unit as shown in FIG. 17. Such shifting operation erases the data of the upper-most unit in the record detection buffer. The value '0' is set to all the bits in the lower-most unit after the shifting operation. In the example of FIG. 17, the record detection buffer has the capacity of storing data of three units. This capacity is, however, not restrictive at all, and the record detection buffer may have the capacity of storing data of a greater number of units.

After shifting the data in the upper direction by one unit, the CPU 102 sets data of a 4-bit length according to the decision results regarding the respective pixels in the target unit (step S602). The respective bits in the 4-bit data are mapped to the pixels constituting the target unit. The upper-most bit, the second bit, the third bit, and the lower-most bit are respectively mapped to the pixel Pa, the pixel Pb, the pixel Pc, and the pixel Pd in the target unit. The processing of step S602 writes the value '1' to each bit corresponding to the dot-on pixel, in which a dot is to be created, in the target unit, while writing the value '0' to each bit corresponding to the dot-off pixel, in which no dot is to be created, in the target unit. For example, when the decision results of a certain target unit show that only the pixel Pb is the dot-on pixel and the other pixels are the dot-off pixels, the processing of step S602 sets the value '0100(2)' as the 4-bit data corresponding to the certain target unit. Here (2) represents binary notation.

At subsequent step S604, the CPU 102 writes the setting of the 4-bit data into the area of the lower-most unit in the record detection buffer. The open arrows toward the respective bits in the lower-most unit in FIG. 17 show the action of writing the setting of the 4-bit data into these bits.

On conclusion of the process of writing the decision results regarding the respective bits in the target unit into the record detection buffer, the program exits from the intra-unit multi-valuing process of the first embodiment shown in the flowchart of FIG. 11 and returns to the tone number conversion process shown in the flowchart of FIG. 5.

As described above, the intra-unit multi-valuing process of the first embodiment carries out the record detection/threshold value setting process to determine the presence or absence of the object record. In the presence of the object record, a greater value than a preset standard value is set to the threshold value th. Such setting of the threshold value th lowers the chance of creating a dot in the target pixel. This arrangement effectively prevents a specific area, in which dots are created at identical pixel positions at a cycle of multiple units, from appearing as a visually recognizable area in the tone number conversion process by units and worsening the picture quality of the resulting image. When the larger setting of the threshold value th causes creation of no dot in a certain target pixel, diffusion of a tone error arising in the target pixel to peripheral unprocessed pixels enhances the chance of creating a dot in these peripheral unprocessed pixels. The procedure of the embodiment may prevent a dot from being created in the originally dot-on pixel, based on the detected status of dot creation in the previous processed units. This, however, does not worsen the picture quality of the resulting image, because of the above reason.

The procedure of the first embodiment changes the setting of the threshold value th, which is used for determination of the dot on-off state, to a greater value in the presence of the object record, so as to lower the chance of creating a dot in the target pixel. One possible modification may determine that no dot is to be created in the target pixel in the presence of the object record. This arrangement readily prevents creation of dots at identical pixel positions at a cycle of multiple units.

The procedure of the first embodiment combines the record detection data with the record data to generate the intermediate data and calculates the logical sum of the respective bits of the intermediate data as the detection result. One possible modification may calculate the logical product of the respective bits of the intermediate data as the detection result. In this case, the value '1' is set to the detection result only when dots are created at all the object pixel positions, for which the status of dot creation is to be detected. This arrangement enables only dots created in a visually recognizable pattern to be effectively detected among dots of a certain density.

D-4. Modifications

The record detection/threshold value setting process of the first embodiment may be modified in various ways. Some examples of possible modification are discussed below.

(1) FIRST MODIFIED EXAMPLE

The record detection/threshold value setting process of the first embodiment detects the status of dot creation in a fixed number of processed units, for example, in three units. The status of dot creation may be detected in a variable number of processed units. The processing of this arrangement is discussed below as a first modified example.

Figure 18:
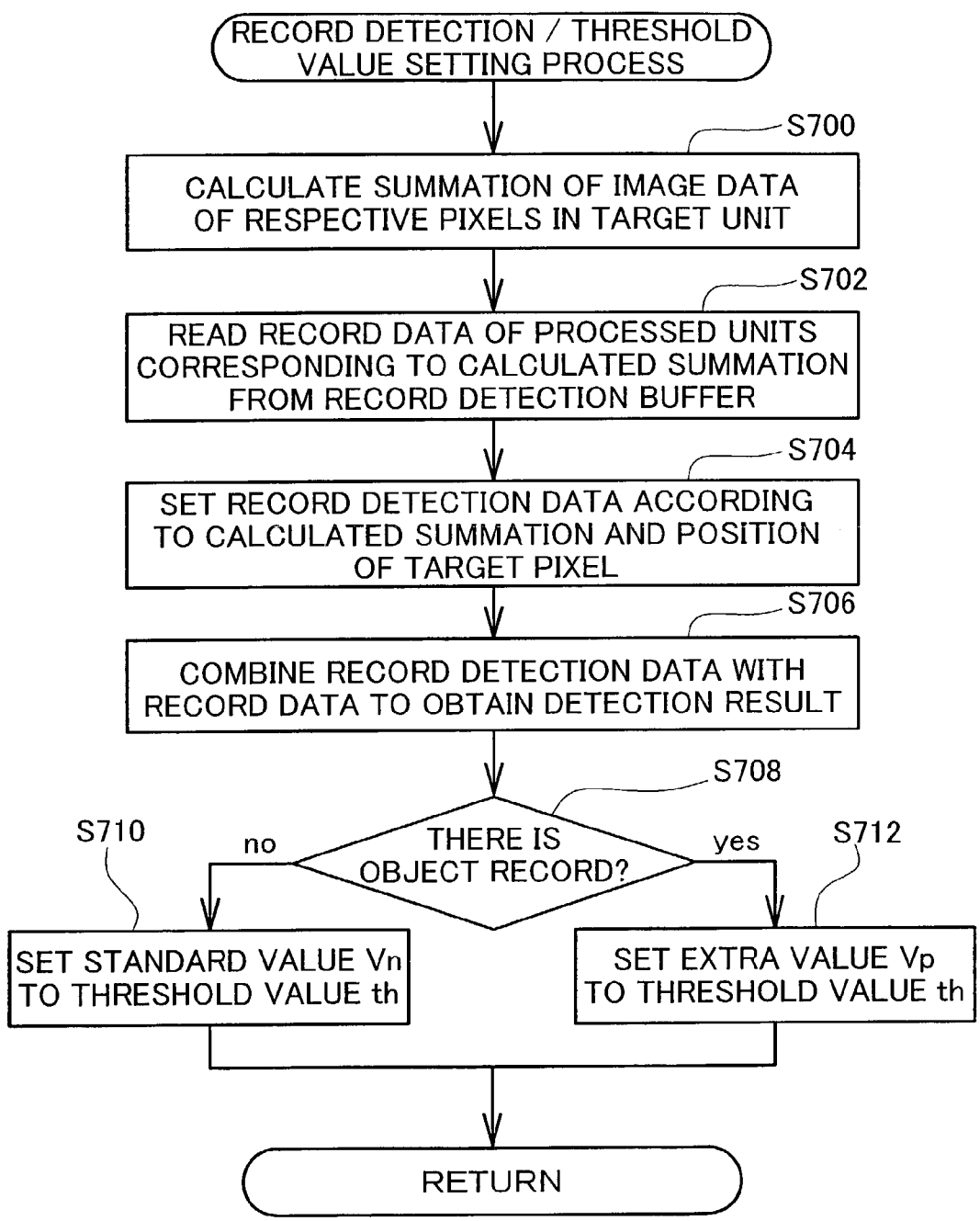
FIG. 18 is a flowchart showing a routine of the record detection/threshold value setting process, which detects the status of dot creation in a varied number of processed units and sets a threshold value based on the detection result, in a first modified example of the first embodiment.

FIG. 18 is a flowchart showing a routine of the record detection/threshold value setting process in the first modified example. The primary difference from the processing of the first embodiment discussed above is that the number of processed units as the object of detection of the dot creation status is varied according to the image data in the target unit. The processing of the first modified example is described below with reference to the flowchart of FIG. 18, with a focus on the difference.

When the program enters the record detection/threshold value setting process in the first modified example, the CPU 102 first calculates the summation of the image data of the respective pixels constituting the target unit (step S700). The image data of the respective pixels constituting the target unit have been read at step S202 in the tone number conversion process shown in the flowchart of FIG. 5, and the summation of the image data of the respective pixels is readily calculated from the input data.

The procedure of the first modified example sets the number of processed units prior to the current target unit, which are the object of detection of the dot creation status, according to the summation of the image data in the target unit. The small summation suggests that the currently processed area should have image data of small tone values (that is, a bright image area). In this area, dots are created at a low density. The processing by units may thus cause a dot creation pattern of a long cycle, if any. In the image data area of small tone values, a larger value is set to the number of processed units as the object, in order to enable detection of a dot creation pattern of a long cycle. Several stages of adequate numerals are set in advance to the number of processed units as the object corresponding to the values of summation. The CPU 102 sets the number of processed units as the object of detection of the dot creation status according to the calculated summation and reads the record data of a bit length corresponding to the setting of the number of processed units from the record detection buffer (step S702).

After reading the record data from the record detection buffer, the CPU 102 sets the record detection data according to the calculated summation and the position of the target pixel (step S704). The procedure of setting is similar to that in the record detection/threshold value setting process of the first embodiment discussed above with reference to the flowchart of FIG. 12. The only difference is a variation in bit length of the record detection data according to the target unit. The procedure of the first modified example calculates the summation of the image data of the respective pixels constituting the target unit and specifies the number of processed units as the object of detection of the dot creation status according to the calculated summation. The bit length of the record detection data is also varied according to the calculated summation.

The CPU 102 subsequently combines the record detection data with the record data to determine the presence or absence of the object record (that is, the status of dot creation to be detected), and set an extra value Vp to the threshold value th in the presence of the object record while setting a standard value Vn to the threshold value th in the absence of the object record (steps S706 through S712). On completion of the above series of processing, the program exits from the record detection/threshold value setting process of the first modified example and returns to the intra-unit multi-valuing process shown in the flowchart of FIG. 11.

The record detection/threshold value setting process of the first modified example detects the status of dot creation in the adequate number of processed units according to the tone value of the currently processed image data. This arrangement more effectively keeps the picture quality of the resulting image at a sufficiently high level. The procedure of the first modified example calculates the summation of the image data of the respective pixels constituting the target unit and determines, in response to the small value of summation, that the currently processed area is a bright image area (that is, an image data area of small tone values). Another method may be applied to determine that the currently processed area is a bright image area. One applicable method utilizes the mean value of the image data in peripheral areas for such determination. The record detection/threshold value setting process of the first modified example sets the number of processed units as the object of detection of the dot creation status according to the summation of the image data of the respective pixels in the target unit. Another possible modification may set the number of processed units or the object pixel position in each unit as the object of detection of the dot creation status according to the tone value of each pixel. This arrangement ensures the more adequate setting to the number of processed units as the object of detection.

(2) SECOND MODIFIED EXAMPLE

In the procedure of the first embodiment, the object pixel position for detection of the dot creation status in processed units is identical with the position of the target pixel in the target unit that is being currently processed. The object pixel position for detection of the dot creation status in processed units may be specified arbitrarily according to the requirements by adequately setting the record detection data. This arrangement is discussed below as a second modified example.

FIG. 19 shows an example of setting the record detection data in the second modified example. In this example, it is assumed that the dot on-off state of the pixel Pa is to be determined in the target unit. As shown in FIG. 19(a), the position of the pixel Pa is specified as the object pixel position for detection of the dot creation status in the 'last unit' one unit prior to the currently processed target unit, while the position of the pixel Pc is specified as the object pixel position for detection of the dot creation status in the 'second last unit' and the 'third last unit' two and three units prior to the currently processed target unit. The mark '?' represents that detection of the status of dot creation is required at these pixel positions. Such setting of the object pixel positions for detection of the dot creation status effectively prevents dot creation in a periodical pattern of the 'lower left pixel', the 'lower left pixel', the 'upper left pixel', and the 'upper left pixel' at a cycle of 4 units.

FIG. 19(b) shows the record detection data set to specify the object pixel positions for detection defined by the mark '?' in FIG. 19(a). As mentioned previously, the record detection data has three 4-bit groups. The three groups of FIG. 19(b) correspond to the three units of FIG. 19(a). The four bits constituting each group are respectively mapped from the upper side (the left side in the drawing) to the pixel Pa, the pixel Pb, the pixel Pc, and the pixel Pd. In the record detection data, the value '1' is set to the bit corresponding to the object pixel position for detection, whereas the value '0' is set to the other bits. FIG. 19(c) shows the setting of the record detection data in hexadecimal notation. The four bits of the record detection data define one unit. The hexadecimal notation of every four bits ensures the simple expression of the record detection data. The record detection data shown in FIG. 19(b) is expressed as '0x228' in hexadecimal notation. Here '0x' represents the hexadecimal notation.

In the procedure of the first embodiment, only one pixel position in each unit is specified as the object pixel position for detection of the dot creation status. Multiple pixel positions in each unit may alternatively be specified as the object pixel positions for detection of the dot creation status. FIG. 20 shows an example of setting the record detection data in the case of detecting the status of dot creation at multiple pixel positions. In this example, three pixel positions are specified as the object of detection of the dot creation status in the 'last unit' one unit prior to the currently processed target unit as shown in FIG. 20(a). FIG. 20(b) shows the record detection data set to detect the status of dot creation at these object pixel positions. The positions of the three pixels Pa, Pb, and Pd are specified as the object pixel positions for detection of the dot creation status in the 'last unit'. The value '1' is accordingly set to the three bits corresponding to the pixels Pa, Pb, and Pd among the lower four bits in the record detection data. This means the setting of D in hexadecimal notation. The position of the pixel Pa is specified as the object pixel position for detection of the dot creation status in the 'second last unit' and the 'third last unit' as in case of FIG. 19. A value '8' is accordingly set to these units in hexadecimal notation. The setting of the record detection data is thus '0x88D' in hexadecimal notation as shown in FIG. 20(c).

As discussed above, the object pixel position for detection of the dot creation status may be specified arbitrarily in each processed unit by adequately setting the record detection data. This arrangement effectively prevents dot creation in a periodical pattern at a cycle of multiple units. Detection of the dot creation status at the pixel positions in the vicinity of the target unit as in the case of FIG. 20 prevents creation of dots close to each other, thus desirably enhancing the dispersibility of dots and improving the picture quality of the resulting image.

(3) THIRD MODIFIED EXAMPLE

The object pixel position for detection of the dot creation status may be specified by using random digits. The procedure of this modified example uses a random digit to set the number of processed units as the object for detection of the dot creation status, and then specifies the object pixel position in each unit based on a random digit. This arrangement eliminates the regularity with regard to the setting of the object pixel position for detection of the dot creation status, thus effectively preventing dot creation in a periodical pattern at a cycle of multiple units.

E. Second Embodiment

The record detection/threshold value setting process in the intra-unit multi-valuing process of the first embodiment stores the record data, which represent the dot creation status in the preset processed units, in one record detection buffer. Each unit consists of multiple pixels. In the arrangement of the first embodiment, the data representing the dot on-off state of the respective pixels are stored as a mixture on the record detection buffer. Another possible arrangement provides multiple record detection buffers corresponding to the number of pixels included in each unit. Every time the dot on-off state is determined in each target pixel, the decision result is stored into a record detection buffer corresponding to the position of the target pixel in each unit. The arrangement of using multiple record detection buffers corresponding to the respective pixel positions in the unit is discussed below as a second embodiment of the present invention.

E-1. Intra-Unit Multi-Valuing Process of Second Embodiment

Figure 21:
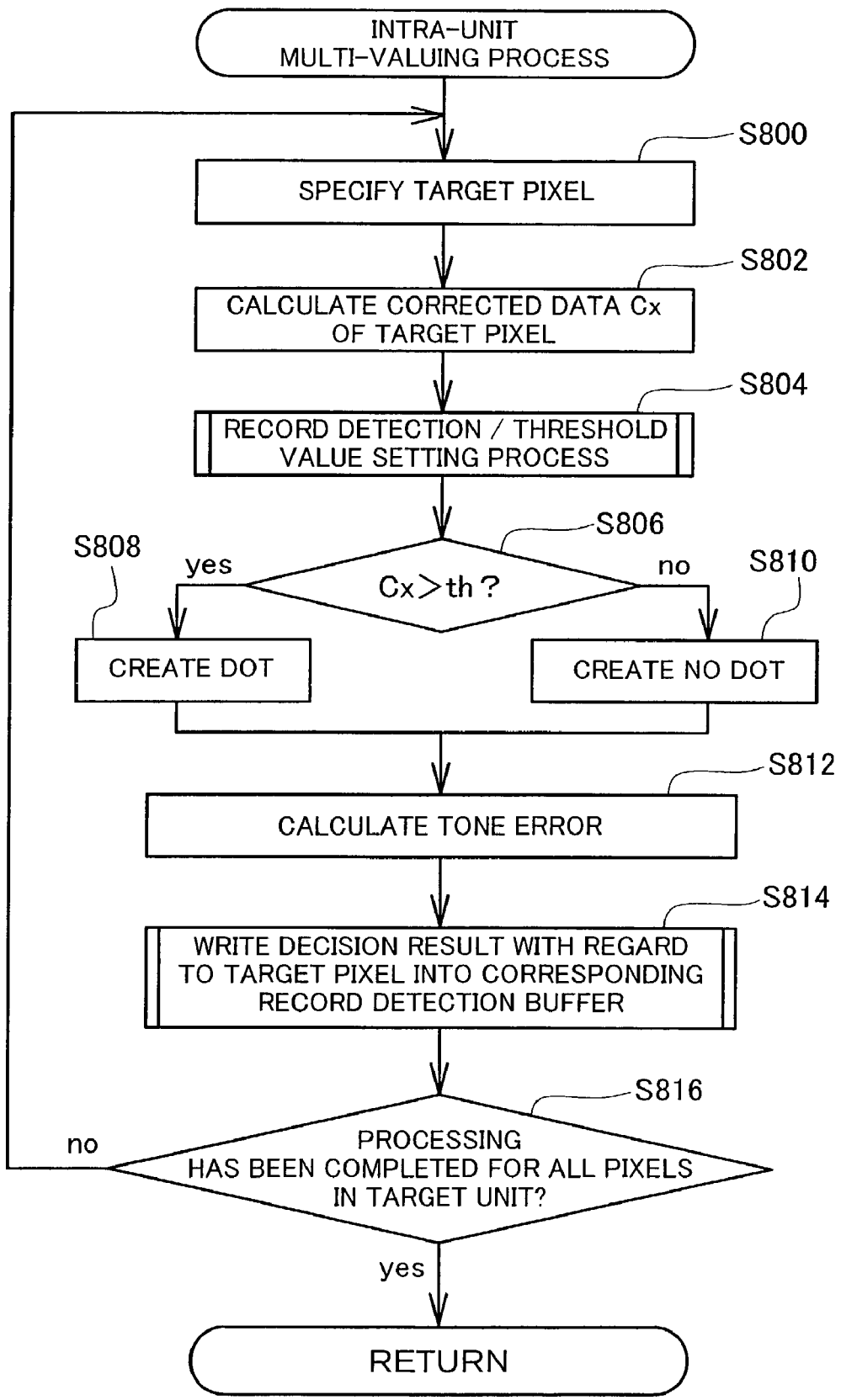
FIG. 21 is a flowchart showing a routine of the intra-unit multi-valuing process, which determines the dot on-off state in each pixel of a target unit, in a second embodiment of the invention.

FIG. 21 is a flowchart showing a routine of the intra-unit multi-valuing process executed in the second embodiment. The primary difference from the intra-unit multi-valuing process of the first embodiment discussed above with reference to the flowchart of FIG. 11 is that multiple record detection buffers are provided corresponding to the respective pixel positions in each unit. Based on this difference, in the procedure of the second embodiment, every time the dot on-off state is determined in each target pixel, the decision result regarding the target pixel is stored into the record detection buffer corresponding to the position of the target pixel in each unit. The following describes the intra-unit multi-valuing process of the second embodiment with a focus on such differences from the first embodiment.

When the program enters the routine of the intra-unit multi-valuing process of the second embodiment, the CPU 102 first specifies a target pixel, in which the dot on-off state is to be determined, among multiple pixels constituting a target unit (step S800), and sums up the image data and the total diffused error of the specified target pixel to generate corrected data Cx (step S802). The image data and the total diffused errors of the respective pixels constituting the target unit have been read in advance in the tone number conversion process shown in the flowchart of FIG. 5.

After calculation of the corrected data Cx with regard to the specified target pixel, the program starts a record detection/threshold value setting process of the second embodiment (step S804). As mentioned above, the structure of the second embodiment uses multiple record detection buffers provided corresponding to the respective pixel positions in each unit. The record detection buffers used in the record detection/threshold value setting process of the second embodiment are discussed below, prior to description of the processing.

Figure 22:
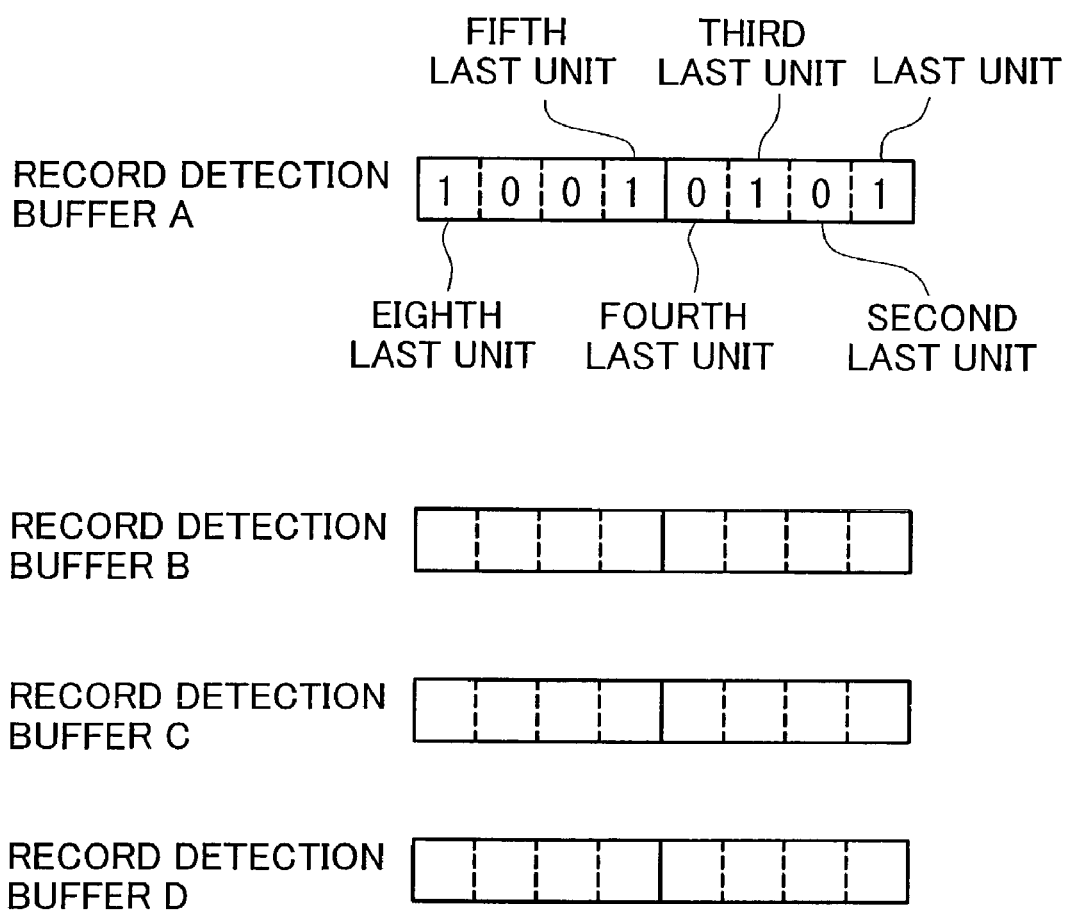
FIG. 22 conceptually shows record detection buffers provided corresponding to respective pixel positions in each unit in the second embodiment.

FIG. 22 shows record detection buffers provided corresponding to the respective pixel positions in each unit. A 'record detection buffer A' is mapped to the position of the pixel Pa in each unit and stores the decision result regarding the dot on-off state of the pixel Pa. Similarly a 'record detection buffer B' is mapped to the position of the pixel Pb in each unit and stores the decision result regarding the dot on-off state of the pixel Pb. A 'record detection buffer C' stores the decision result regarding the dot on-off state of the pixel Pc in each unit, and a 'record detection buffer D' stores the decision result regarding the dot on-off state of the pixel Pd in each unit. In the arrangement of the second embodiment, the record data regarding the respective pixels are separately stored in the multiple record detection buffers provided corresponding to the respective pixel positions in each unit.

The record data stored in, for example, the record detection buffer A has the following data structure. The respective bits in the record detection buffer A are mapped from the lower side (the right side in the drawing of FIG. 22) to multiple processed units prior to the currently processed target unit. The lower-most bit (the right-end bit) is mapped to the 'last unit' that is one unit prior to the target unit. The second lower bit is mapped to the 'second last unit', and the third lower bit is to the 'third last unit'. In this manner, the respective bits are sequentially mapped to the multiple processed units. Setting of a value '1' to a certain bit means that a dot is to be created at the position of the pixel Pa in a unit corresponding to the certain bit. Setting of a value '0' to the certain bit means that no dot is to be created at the position of the pixel Pa in the unit corresponding to the certain bit.

In the example of FIG. 22, the record data stored in the record detection buffer A specifies creation of a dot at the position of the pixel Pa in the last unit, the third last unit, the fifth last unit, and the eighth last unit, which are respectively one unit, three units, five units, and eight units prior to the target unit, and creation of no dot at the position of the pixel pa in the other units. Each record detection buffer has a data length of 8 bits in the example of FIG. 22. This data length is, however, not restrictive at all, and each record detection buffer may have a data length of a greater number of bits.

The record detection/threshold value setting process of the second embodiment is similar to the processing of the first embodiment, except that the multiple record detection buffers are provided corresponding to the respective pixel positions. The record detection/threshold value setting process of the second embodiment is discussed below with reference to the flowchart of FIG. 12 showing the record detection/threshold value setting process of the first embodiment. After specifying the target pixel in the intra-unit multi-valuing process at step S800 in the flowchart of FIG.

21, the program executes this record detection/threshold value setting process with regard to the specified target pixel at step S804.

When the program enters the record detection/threshold value setting process of the second embodiment, the CPU 102 first reads the record data from the record detection buffer (corresponding to step S500 in the flowchart of FIG. 12). In the structure of the second embodiment, multiple record detection buffers are provided corresponding to the respective pixel positions in each unit as shown in FIG. 22. The reading step accordingly reads the record data of a required data length from the record detection buffer corresponding to the pixel position of the specified target pixel. In one example, it is assumed that the specified target pixel is the pixel Pa and the record data of five processed units are used for detection of the dot creation status. In this case, the reading step reads the record data of 5 bits from the lower side in the record detection buffer A, which is mapped to the position of the pixel Pa. In the example of FIG. 22, the setting '10101 (2)' is accordingly read as the record data, where (2) represents binary notation. In response to the specification of the target pixel at the pixel Pb, at the pixel Pc, or at the pixel Pd, the record data is read from the corresponding record detection buffer B, C, or D.

Figure 23A:
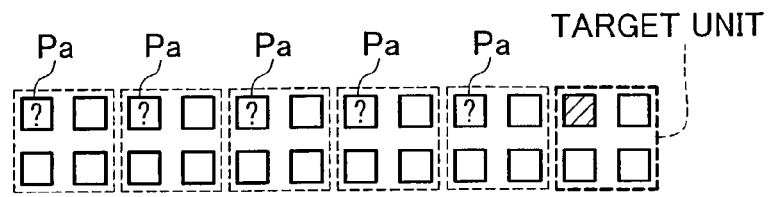
FIG. 23 conceptually shows a method of setting the record detection data according to object pixel positions for detection of dot creation status in the second embodiment.

After reading the record data, the CPU 102 sets the record detection data (corresponding to step S502 in the flowchart of FIG. 12). The setting is discussed with reference to FIG. 23. In the example of FIG. 23, five processed units are specified as the object of detection of the dot creation status. FIG. 23(a) shows the object pixel positions for detection of the dot creation status in the specified processed units. The small squares represent pixels. The large square of thick broken line represents a currently processed unit or a target unit. The large squares of thin broken lines represent processed units specified as the object of detection. The hatched pixel in the target unit represents a target pixel. The pixels with the mark '?' in the processed units represent the object pixel positions for detection of the dot creation status.

Figure 23C:
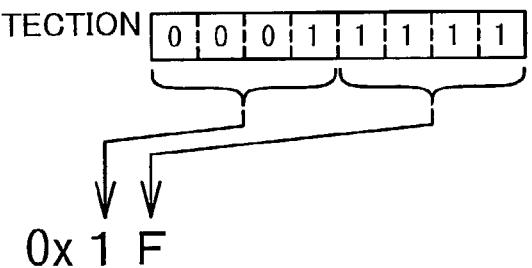

FIG. 23(b) shows the record detection data used for detection of the dot creation status at the object pixel positions. In this example, the five processed units prior to the target unit are specified as the object for detection. In the record detection data, the value '1' is accordingly set to five bits, the lower-most bit through the fifth lower bit, whereas the value '0' is set to the upper bits than the fifth lower bit. The record detection data is specified by setting the value '1' to the bits corresponding to the processed units specified as the object of detection and the value '0' to the other bits. FIG. 23(c) shows the setting of the record detection data in hexadecimal notation.

On completion of setting the record detection data, the CPU 102 combines the record detection data with the record data read in advance to determine the presence or absence of the object record (the status of dot creation at the object pixel position to be detected) (corresponding to step S504 in the flowchart of FIG. 12). The procedure of the first embodiment is applied for detection of the object record. The procedure calculates the logical product of the corresponding bits in the record data and the record detection data to generate the intermediate data and then calculates the logical sum of the respective bits of the intermediate data as the detection result. When the detection result is equal to the value '1', the procedure determines the presence of the object record and sets the extra value Vp to the threshold value th (corresponding to steps S506 and S510 in FIG. 12). When the detection result is equal to the value '0', on the other hand, the procedure determines the absence of the object record and sets the standard value Vn to the threshold value th (corresponding to steps S506 and S508 in FIG. 12). On completion of the setting of the adequate value to the threshold value th, the program exits from the record detection/threshold value setting process of the second embodiment and returns to the intra-unit multi-valuing process shown in the flowchart of FIG. 21. The procedure of the second embodiment calculates the logical sum of the respective bits of the intermediate data as the detection result. One possible modification may calculate the logical product of the respective bits of the intermediate data as the detection result.

In the intra-unit multi-valuing process of the second embodiment shown in FIG. 21, the setting of the threshold value th is compared with the corrected data Cx of the specified target pixel (step S806). When the corrected data Cx is greater than the threshold value th, it is determined that a dot is to be created in the target pixel (step S808). Otherwise it is determined that no dot is to be created in the target pixel (step S810). The CPU 102 subsequently calculates the tone error arising in the target pixel due to determination of the dot on-off state (step S812) and writes the decision result regarding the target pixel into the record detection buffer corresponding to the target pixel (step S814). The concrete procedure of this writing step is discussed below with reference to FIG. 24.

Figure 24:
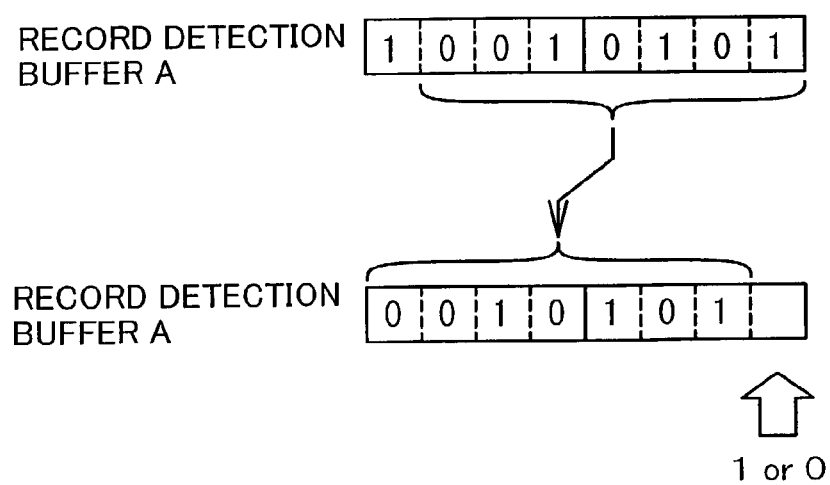
FIG. 24 conceptually shows a method of writing a decision result regarding the dot on-off state of a target pixel into the record detection buffer in the second embodiment.

FIG. 24 shows an example of writing the decision result with regard to the target pixel into the corresponding record detection buffer in the intra-unit multi-valuing process of the second embodiment. In this example, the pixel Pa is the specified target pixel. The decision result representing the dot on-off state of the target pixel is accordingly written into the corresponding record detection buffer A. The writing procedure first shifts the record data stored in the record detection buffer A in the upper direction (leftward in the drawing) by one bit. The upper row of FIG. 24 represents the record data stored in the record detection buffer A before shifting, and the lower row represents the record data stored in the record detection buffer A after shifting. The data stored in the upper-most bit of the record data is erased by this shifting operation. The procedure then writes the value representing the decision result with regard to the target pixel into the lower-most bit. The value '1' is written into the lower-most bit when it is determined that a dot is to be created in the target pixel. The value '0' is written into the lower-most bit, on the other hand, when it is determined no dot is to be created in the target pixel. In the case where another pixel, instead of the pixel Pa, is specified as the target pixel, the procedure writes the value representing the decision result with regard to the target pixel into the record detection buffer mapped to the pixel position of the specified target pixel. According to this procedure, the decision result with regard to the target pixel is written into the record detection buffer corresponding to the target pixel at step S814 in the flowchart of FIG. 21.

After the decision result with regard to the target pixel is written into the corresponding record detection buffer at step S814, it is determined whether or not the processing has been completed for all the pixels in the target unit (step S816). When there is any unprocessed pixel in the target unit, the program returns to step S800 and repeats the above series of processing with regard to a newly specified target pixel. When the processing has been completed for all the pixels, the program exits from the intra-unit multi-valuing process shown in the flowchart of FIG. 21 and returns to the tone number conversion process shown in the flowchart of FIG. 5.

In the intra-unit multi-valuing process of the second embodiment, the respective bits of each record detection buffer are mapped to the individual processed units. In the case of an increase in number of processed units specified as the object of detection of the dot creation status, the procedure of the second embodiment reads the record data of a bit length corresponding to the increased number of processed units from the record detection buffer. For example, when eight processed units, each unit consisting of four pixels, are specified as the object of detection of the dot creation status, the procedure of the second embodiment is required to read the record data of only 8 bits. This bit length of the record data is significantly shorter than the record data of 32 bits, which is required in the procedure of the first embodiment. Namely the arrangement of the second embodiment ensures the high-speed processing even when a large number of processed units are specified as the object of detection.

E-2. Modifications

In the procedure of the second embodiment, the object pixel position for detection of the dot creation status in processed units is identical with the position of the target pixel in the target unit. Like the second modified example of the first embodiment described previously, the object pixel position for detection of the dot creation status may be specified arbitrarily in each processed unit. This arrangement is discussed below as a modified example of the second embodiment.

FIG. 25 shows a method of detecting the status of dot creation at arbitrary pixel positions in the modified example of the second embodiment. FIG. 25(a) shows the object pixel positions for detection of the dot creation status. The small squares represent pixels, and the large squares of broken line represent units. The pixels with the mark '?' represent the object pixel positions for detection of the dot creation status. The object pixel positions for detection and its number may be set arbitrarily. The following description is on the assumption that the status of dot creation is detected at the pixel positions specified in FIG. 25(a).

Figure 25A:
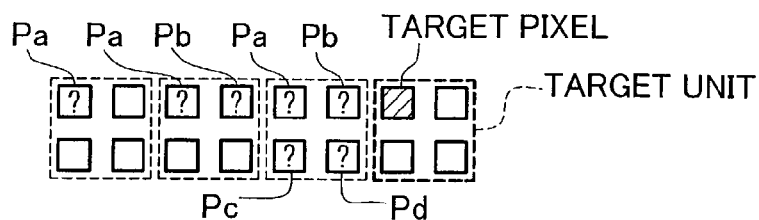
FIG. 25 conceptually shows a method of combining the record data with the record detection data to detect the dot creation status at arbitrary pixel positions in a modified example of the second embodiment.

FIGS. 25(b) through 25(e) show the process of detecting the dot creation status at the respective pixel positions in the modified example of the second embodiment. As described above, in the structure of the second embodiment, the decision results regarding the dot on-off state of the target pixel are stored corresponding to the respective pixel positions in each unit. The procedure of the modified example accordingly specifies the object pixel positions in the respective processed units for detection of the dot creation status. In the example of FIG. 25(a), three processed units, that is, the 'last unit', the 'second last unit', and the 'third last unit', which are respectively one unit, two units, and three units prior to the currently processed target unit, are the object of detection of the dot creation status at the position of the pixel Pa. Two processed units, that is, the 'last unit' and the 'second last unit' are the object of detection of the dot creation status at the position of the pixel Pb. Only one processed unit, that is, the 'last unit' is the object of detection of the dot creation status at the positions of the pixels Pc and Pd. The procedure of the second embodiment specifies the processed units as the object of detection of the dot creation status at each object pixel position and determines whether or not a dot has been created at the object pixel position in the respective specified units. This arrangement ensures effective detection of the dot creation status at arbitrary pixel positions. This is described in detail with reference to FIGS. 25(b) through 25(e).

Figure 25B:

FIG. 25(b) shows detection of the dot creation status at the position of the pixel Pa. The procedure first reads the record data corresponding to the three processed units (the 3-bit data from the lower-most bit) from the record detection buffer A, in which the decision results regarding the dot-on-off state in the pixel Pa have been stored. When a greater number of processed units are specified as the object of detection of the dot creation status, data of a greater bit length are to be read from the record detection buffer.

The procedure then combines the record data with the record detection data. The record detection data is set according to the processed units specified as the object of detection of the dot creation status at the position of the pixel Pa. In the example of FIG. 25(a), the three processed units, the 'last unit', the 'second last unit', and the 'third last unit' are specified as the object of detection of the dot creation status at the position of the pixel Pa. The value '1' is accordingly set to the lower-most bit, the second lower bit, and the third lower bit in the record detection data. The procedure combines the 3-bit record data with the record detection data, which is set as '111 (2)' in binary notation, to generate intermediate data. The concrete process of 'combining the record data with the record detection data' calculates the logical product of the corresponding bits in the record data and the record detection data, as described previously. The procedure then calculates the logical sum of the respective bits of the intermediate data to obtain the detection result with regard to the pixel Pa.

The detection result obtained with regard to the pixel Pa is interpreted as follows. The detection result equal to the value '0' means that no dot has been created at the pixel Pa in any of the processed units specified as the object of detection. The detection result equal to the value '1', on the other hand, means that a dot has been created at the pixel Pa in at least one of the processed units specified as the object of detection. One possible modification may calculate the logical product of the respective bits of the intermediate data, instead of the logical sum. In this modified procedure calculating the logical product of the respective bits of the intermediate data, the detection result equal to the value '1' means that a dot has been created at the pixel Pa in all of the processed units specified as the object of detection.

Figure 25C:

The detection result with regard to the pixel Pb is obtained according to the similar procedure. FIG. 25(c) shows detection of the dot creation status at the position of the pixel Pb. The procedure first reads the record data corresponding to the three processed units from the record detection buffer B, in which the decision results regarding the dot-on-off state in the pixel Pb have been stored. The procedure subsequently combines the record data with the record detection data to generate intermediate data. The two processed units, the 'last unit' and the 'second last unit' are specified as the object of detection of the dot creation status at the position of the pixel Pb. The record detection data is accordingly set as '011 (2)' in binary notation, where the value '1' is set to the lower-most bit and the second lower bit. The procedure calculates the logical sum of the respective bits of the intermediate data, so as to obtain the detection result with regard to the pixel Pb.

Figure 25D:
Figure 25E:
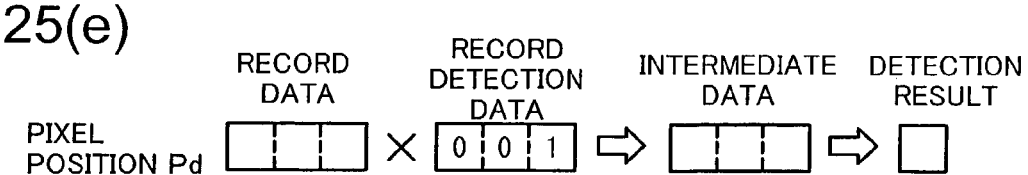

The detection results with regard to the pixels Pc and Pd are obtained in a similar manner. FIGS. 25(d) and 25(e) respectively show detection of the dot creation status at the positions of the pixels Pc and Pd. At the positions of the pixels Pc and Pd, only one processing unit, the 'last unit' is specified as the object of detection of the dot creation status.

The record detection data is accordingly set as '001 (2)' in binary notation, where the value '1' is set to only the lower-most bit.

The procedure calculates the logical sum of the detection results regarding the respective pixel positions to obtain a final detection result. The final detection result is equal to the value '1' when a dot has been created in at least one of the pixels with the mark '?' in FIG. 25(a). The final detection result is equal to the value '0', on the other hand, when no dot has been created in any of the pixels with the mark '?'. One possible modification may calculate the logical product of the detection results regarding the respective pixel positions to obtain a final detection result. In this modified arrangement, the final detection result is equal to the value '1' when a dot has been created in all the pixels with the mark '?' in FIG. 25(a).

As described above, the modified procedure of the second embodiment enables the object pixel positions for detection of the dot creation status to be freely set in the respective processed units. The procedure determines the dot on-off state in each target pixel of a unit, based on the detection result regarding the dot creation status at a predetermined object pixel position. This arrangement effectively prevents dots from being formed in a periodical pattern at a cycle of multiple units.

The above embodiments and their modified examples are to be considered in all aspects as illustrative and not restrictive. There may be many other modifications, changes, and alterations without departing from the scope or spirit of the main characteristics of the present invention.

In the embodiments and their modified examples described above, the error diffusion method is applied to determine the dot on-off state in each of multiple pixels constituting a unit. Another known technique, such as the dither method, is also applicable for the same purpose.

In the embodiments and their modified examples described above, the procedure lowers the chance of creating a dot in a target pixel when the detection result shows that a dot has been created at a predetermined pixel position in a preset number of processed units. One modified procedure may enhance the chance of creating a dot in a target pixel when the detection result shows that no dot has been created at a predetermined pixel position in a preset number of processed units. This arrangement effectively prevents the picture quality of the resulting image from being worsened by the periodical appearance of pixels with no dots at a cycle of multiple units in an image area having dots at a high density.

The computer may execute the software programs (application programs) read into its main memory or an external storage device via a communication line to actualize the respective functions of the image data conversion process discussed above. The computer may otherwise read and execute the software programs stored in a recording medium, such as a CD-ROM or a flexible disk.

In the embodiments and their modified examples described above, the routine of the image data conversion process including the tone number conversion process is executed by the computer. Part or all of the image data conversion process may alternatively be executed by the printer or by an exclusive image processing apparatus.

The image display apparatus is not restricted to the printing apparatus that creates ink dots on a printing medium to print a resulting image. Another example of the image display apparatus is a liquid crystal display apparatus that makes luminescent points dispersed at adequate densities on the screen of a liquid crystal display to express an image of continuously varying tones.

The scope and spirit of the present invention are indicated by the appended claims, rather than by the foregoing description.

What is claimed is:

1. An image processing apparatus that converts image data expressed by tone values of respective pixels constituting an image into dot data representing dot on-off state, said image processing apparatus comprising:
    a dot data conversion module that joins a preset number of adjacent pixels into a unit and collectively converts the image data of each unit into the dot data; and
    a dot on-off state storage module that stores dot on-off state determined with regard to at least part of pixels included in a processed unit, which has been subjected to the data conversion, in such a manner that a pixel position in the processed unit is identifiable,
    wherein said dot data conversion module comprises:
    a target pixel specification sub-module that successively specifies a target pixel, in which a dot on-off state is to be determined, in each unit;
    a dot creation status detection sub-module that detects a dot creation status with regard to an object pixel that is located at a specific position relative to the target pixel, among the at least part of the pixels included in the processed unit, for which the dot on-off state is stored; and
    a dot on-off state determination sub-module that determines the dot on-off state in the target pixel, based on a tone value of the image data at the target pixel and the dot creation status detected with regard to the object pixel at the specific position.

2. An image processing apparatus in accordance with claim 1, wherein said dot on-off state determination sub-module comprises:
    a dot formation prohibition sub-module that prohibits formation of a dot in the target pixel, when the detected dot creation status shows presence of a dot in the object pixel at the specific position.

3. An image processing apparatus in accordance with claim 2, wherein said dot creation status detection sub-module detects dot creation status with regard to multiple object pixels that are located at the specific position relative to the target pixel, and
    said dot formation prohibition sub-module prohibits formation of a dot in the target pixel, when the detected dot creation status shows presence of a dot in any of the multiple object pixels at the specific position.

4. An image processing apparatus in accordance with claim 2, wherein said dot creation status detection sub-module detects dot creation status with regard to multiple object pixels that are located at a specific position relative to the target pixel, and
    said dot formation prohibition sub-module prohibits formation of a dot in the target pixel, when the detected dot creation status shows presence of a dot in all of the multiple object pixels at the specific position.

5. An image processing apparatus in accordance with claim 1, wherein said dot on-off state determination sub-module comprises:
    a dot formation recommendation sub-module that recommends formation of a dot in the target pixel, when the detected dot creation status shows presence of a dot in the object pixel at the specific position.

6. An image processing apparatus in accordance with claim 1, wherein said dot data conversion module further comprises:
a summation calculation sub-module that calculates a summation of tone values of the respective pixels included in each unit, and
said dot on-off state determination sub-module determines the dot on-off state in the target pixel, based on the calculated summation as well as the tone value of the image data at the target pixel and the dot creation status detected with regard to the object pixel at the specific position.

7. An image processing apparatus in accordance with claim 6, wherein said dot on-off state determination sub-module comprises:
a suppression sub-module that suppresses formation of a dot in the target pixel, when the calculated summation is not greater than a predetermined value.

8. An image processing apparatus in accordance with claim 6, wherein said dot on-off state determination sub-module comprises:
a promotion sub-module that promotes formation of a dot in the target pixel, when the calculated summation is not less than a preset value.

9. An image processing apparatus in accordance with claim 6, wherein said dot data conversion module further comprises:
a pixel position storage sub-module that stores a mapping of an object pixel position for detection of the dot creation status to a tone value, and
said dot creation status detection sub-module detects the dot creation status with regard to an object pixel position mapped to the calculated summation of the tone values.

10. An image processing apparatus in accordance with claim 9, wherein said pixel position storage sub-module stores a mapping, such that a pixel position mapped to a first tone value that is smaller than a predetermined value is farther from the target pixel than a pixel position mapped to a second tone value that is greater than the predetermined value.

11. An image processing apparatus in accordance with claim 1, wherein said dot data conversion module further comprises:
a pixel position storage sub-module that stores a mapping of an object pixel position for detection of the dot creation status to a tone value, and
said dot creation status detection sub-module detects the dot creation status with regard to an object pixel position mapped to the tone value of the target pixel.

12. An image processing apparatus in accordance with any one of claims 1, 2, 5, and 6, wherein said dot on-off state determination sub-module applies an error diffusion method to determine the dot on-off state in the target pixel, and varies a threshold value of the error diffusion method, which is referred to for the determination, according to the dot creation status detected by said dot creation status detection sub-module.

13. An image processing apparatus in accordance with claim 1, wherein said dot on-off state determination sub-module applies an error diffusion method to determine the dot on-off state in the target pixel, and decides that no dot is to be created in the target pixel when the detected dot creation status shows the presence of a dot in the object pixel at the specific position relative to the target pixel.

14. An image processing apparatus in accordance with claim 1, wherein said dot on-off state storage module stores a data array of multiple consecutive data, which represent the dot on-off state of multiple pixels and are arranged in a specific order that allows for identification of the processed unit to which each pixel belongs and a position of the pixel in the processed unit.

15. An image processing apparatus in accordance with claim 1, wherein said dot on-off state storage module stores a data array of multiple consecutive data, which represent the dot on-off state of multiple pixels, are classified into each pixel position in the processed unit, and are arranged in a specific order that allows for identification of the processed unit to which each pixel belongs, corresponding to each pixel position in the processed unit.

16. A printing apparatus that receives image data expressed by tone values of respective pixels constituting an image and creates dots on a printing medium based on the input image data, said printing apparatus comprising:
a unit definition module that joins a preset number of adjacent pixels into a unit;
a dot data conversion module that collectively converts image data of multiple pixels constituting each unit into dot data representing dot on-off state of the respective pixels;
a dot creation module that creates dots in specified pixels, based on the converted dot data; and
a dot on-off state storage module that stores dot on-off state determined with regard to at least part of pixels included in a processed unit, which has been subjected to the data conversion, in such a manner that a pixel position in the processed unit is identifiable,
wherein said dot data conversion module comprises:
a target pixel specification sub-module that successively specifies a target pixel, in which a dot on-off state is to be determined, in each unit;
a dot creation status detection sub-module that detects a dot creation status with regard to an object pixel that is located at a specific position relative to the target pixel, among the at least part of the pixels included in the processed unit, for which the dot on-off state is stored; and
a dot on-off state determination sub-module that determines the dot on-off state in the target pixel, based on a tone value of the image data at the target pixel and the dot creation status detected with regard to the object pixel at the specific position.

17. An image processing method of converting image data expressed by tone values of respective pixels constituting an image into dot data representing dot on-off state, said image processing method comprising the steps of:
joining a preset number of adjacent pixels into a unit and collectively converting the image data of each unit into the dot data; and
storing dot on-off state determined with regard to at least part of pixels included in a processed unit, which has been subjected to the data conversion, in such a manner that a pixel position in the processed unit is identifiable,
wherein said converting step comprises the sub-steps of:
successively specifying a target pixel, in which a dot on-off state is to be determined, in each unit;
detecting a dot creation status with regard to an object pixel that is located at a specific position relative to the target pixel, among the at least part of the pixels included in the processed unit, for which the dot on-off state is stored; and
determining the dot on-off state in the target pixel, based on a tone value of the image data at the target pixel and the dot creation status detected with regard to the object pixel at the specific position.

18. A computer program product that attains a method of converting image data expressed by tone values of respective pixels constituting an image into dot data representing dot on-off state, said computer program product comprising:

a computer readable recording medium; and a computer program that is stored in said recording medium, said computer program causing a computer to attain the functions of:

joining a preset number of adjacent pixels into a unit and collectively converting the image data of each unit into the dot data; and storing dot on-off state determined with regard to at least part of pixels included in a processed unit, which has been subjected to the data conversion, in such a manner that a pixel position in the processed unit is identifiable, wherein said converting function comprises the sub-functions of:

successively specifying a target pixel, in which a dot on-off state is to be determined, in each unit;

detecting a dot creation status with regard to an object pixel that is located at a specific position relative to the target pixel, among the at least part of the pixels included in the processed unit, for which the dot on-off state is stored; and determining the dot on-off state in the target pixel, based on a tone value of the image data at the target pixel and the dot creation status detected with regard to the object pixel at the specific position.

\* \* \* \* \*